(12) United States Patent
Mori

(10) Patent No.: US 8,990,373 B2
(45) Date of Patent: *Mar. 24, 2015

(54) INFORMATION PROCESSING APPARATUS, INFORMATION PROCESSING SYSTEM, AND STORAGE MEDIUM

(75) Inventor: Shinya Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 13/531,835

(22) Filed: Jun. 25, 2012

(65) Prior Publication Data

US 2013/0013762 A1 Jan. 10, 2013

(30) Foreign Application Priority Data

Jul. 4, 2011 (JP) .................................. 2011-148383

(51) Int. Cl.
*G06F 15/173* (2006.01)
*G06F 3/00* (2006.01)

(52) U.S. Cl.
CPC ........................................ *G06F 3/00* (2013.01)
USPC .......... 709/223; 709/203; 358/1.13; 358/1.15

(58) Field of Classification Search
None
See application file for complete search history.

(56) References Cited

U.S. PATENT DOCUMENTS

| | | | |
|---|---|---|---|
| 8,305,606 B2* | 11/2012 | Negoro ......................... | 358/1.15 |
| 2008/0068647 A1* | 3/2008 | Isobe et al. .................... | 358/1.15 |
| 2008/0158585 A1* | 7/2008 | Miwa ............................ | 358/1.13 |
| 2010/0067035 A1 | 3/2010 | Kawakubo et al. | |
| 2010/0165388 A1 | 7/2010 | Ikeura | |
| 2011/0063657 A1* | 3/2011 | Okada .......................... | 358/1.15 |

FOREIGN PATENT DOCUMENTS

| | | |
|---|---|---|
| JP | 2010-074302 | 4/2010 |
| JP | 2010-157027 | 7/2010 |

* cited by examiner

*Primary Examiner* — Mohamed Ibrahim
(74) *Attorney, Agent, or Firm* — IPUSA, PLLC

(57) ABSTRACT

An information processing apparatus, which is connected via a network to plural execution apparatuses, includes a receiving unit configured to receive function validity information from the execution apparatuses; a reception unit configured to receive an execution request for requesting the execution apparatuses to execute a requested function, which execution request does not include information identifying one of the execution apparatuses where the requested function is to be executed; a determining unit configured to determine execution apparatuses where the requested function is valid based on the function validity information; a display control unit configured to cause a display unit to display information indicating the determined execution apparatuses where the requested function is valid based on the determination result; and a transmitting unit configured to send the execution request to a selected execution apparatus when a reception instruction to receive the execution request is entered on the selected execution apparatus.

10 Claims, 21 Drawing Sheets

FIG.6

| USER ID | WIDGET MANAGER URI |
|---------|--------------------|
| USER A | http://xxxxxxxxx |
| USER B | ... |
| | |

| FUNCTION IDENTIFIER | SETTING NAME | SETTING VALUE | VALIDITY INDICATOR |
|---|---|---|---|
| scan | COLOR | FULL COLOR | ○ |
| | COLOR | GRAYSCALE | × |
| | COLOR | MONOCHROME, CHARACTER | ○ |
| | COLOR | MONOCHROME, CHARACTER/GRAPHICS | ○ |
| | COLOR | MONOCHROME, CHARACTER/PHOTO | ○ |
| | COLOR | MONOCHROME, PHOTO | ○ |
| | RESOLUTION | 200 | ○ |
| | RESOLUTION | 300 | ○ |
| | RESOLUTION | 400 | ○ |
| | SCAN MODE | DUPLEX | ○ |
| | ... | ... | ... |
| print | COLOR | FULL COLOR | ○ |
| | COLOR | GRAYSCALE | × |
| | LAYOUT | 2in1 | ○ |
| | ... | ... | ○ |
| | PRINT MODE | DUPLEX | ○ |
| | ... | ... | ... |

A: scan rows
B: print rows

| APPARATUS ID | IP ADDRESS | FUNCTION VALIDITY INFORMATION 227 |
|---|---|---|
| 0001 | 192.168.0.10 | SCAN COLOR: FULL COLOR, ···, SCAN MODE: DUPLEX, ··· PRINT COLOR: FULL COLOR, ··· |
| 0002 | 192.168.0.11 | SCAN COLOR: FULL COLOR, ···, SCAN MODE: DUPLEX, ··· PRINT COLOR: FULL COLOR, ···, PRINT MODE: DUPLEX, ··· |
| ··· | ··· | ··· |

FIG.9

| WIDGET ID | print001 |
| --- | --- |
| LINKED FUNCTION IDENTIFIER | print |
| DISPLAY NAME | PRINT |
| : | : |

FIG.10

| WIDGET ID | scan001 |
| --- | --- |
| LINKED FUNCTION IDENTIFIER | scan |
| DISPLAY NAME | SCAN |
| : | : |

FIG.12

| SETTING NAME | SETTING VALUE |
|---|---|
| LAYOUT | 2in1 |
| PRINT MODE | DUPLEX |
| COLOR | GRAYSCALE |
| : | : |

FIG.15

| SETTING NAME | SETTING VALUE |
|---|---|
| SCAN MODE | DUPLEX |
| COLOR | FULL COLOR |
| RESOLUTION | 400 |
| : | : |

INFORMATION PROCESSING APPARATUS, INFORMATION PROCESSING SYSTEM, AND STORAGE MEDIUM

CROSS-REFERENCE TO RELATED APPLICATION

The present application is based upon and claims the benefit of priority of Japanese Patent Application No. 2011-148383, filed on Jul. 4, 2011, the entire contents of which are incorporated herein by reference.

BACKGROUND OF THE INVENTION

1. Field of the Invention

An aspect of this disclosure relates to an information processing apparatus, an information processing system, and a storage medium.

2. Description of the Related Art

Japanese Laid-Open Patent Publication No. 2010-157027 discloses programs (called net applications) that are installed in personal computers (PCs) connected via a network with image forming apparatuses. The net applications cause the PCs to perform process flows in collaboration with the image forming apparatuses.

In the technology disclosed in JP2010-157027, information associated with the net applications running on the PCs is sent to the image forming apparatuses via broadcasts called advertisements. More specifically, when the net applications are started, users who have started the net applications are advertised on the network. Each image forming apparatus receives the advertisements from the PCs and manages a list of users who have started the net applications on the respective PCs. In response to a command from an operator (a user), the image forming apparatus displays the list of users on an operations panel. When the operator selects the corresponding user from the list of users, a list of net applications that have been started on the PC of the selected user is downloaded into the image forming apparatus. Then, the operator can select and use one of the net applications in the list of net applications.

The above configuration enables a user to select a desired image forming apparatus from image forming apparatuses installed in, for example, an office and to use net applications on the selected image forming apparatus.

However, image forming apparatuses installed in an office do not necessarily have the same functions. For example, color image forming apparatuses and monochrome image forming apparatuses may be installed in an office. As another example, multifunction peripherals that have printing and scanning functions and printers that have only the printing function may coexist in an office.

For this reason, there may be a case where a selected image forming apparatus does not have a function to be used by a net application selected by the user on that image forming apparatus. In such a case, the user cannot obtain an expected result and needs to operate another image forming apparatus to select and execute the net application.

The above problem reduces the working efficiency of the user and may result in waste of resources such as paper.

SUMMARY OF THE INVENTION

In an aspect of this disclosure, there is provided an information processing apparatus connected via a network to plural execution apparatuses. The information processing apparatus includes a receiving unit configured to receive function validity information from each of the execution apparatuses, which function validity information indicates functions that are valid in the respective execution apparatuses; a reception unit configured to receive an execution request for requesting the execution apparatuses to execute a requested function, which execution request does not include information identifying one of the execution apparatuses where the requested function is to be executed; a determining unit configured to determine one or more of the execution apparatuses where the requested function is valid based on the function validity information; a display control unit configured to cause a display unit to display information indicating the one or more of the execution apparatuses where the requested function is valid based on a result of the determination by the determining unit; and a transmitting unit configured to send the execution request to a selected execution apparatus of the execution apparatuses when a reception instruction to receive the execution request is entered on the selected execution apparatus.

BRIEF DESCRIPTION OF THE DRAWINGS

FIG. 6 is a table illustrating an exemplary configuration of a user management table;

FIG. 7 is a table illustrating an exemplary configuration of information stored in a function validity information storing unit;

FIG. 8 is a table illustrating an exemplary configuration of information stored in a function validity information cache;

FIG. 9 is a table illustrating exemplary widget information of a print widget;

FIG. 10 is a table illustrating exemplary widget information of a scan widget;

FIG. 12 is a table illustrating exemplary print configuration information for a print widget;

FIG. 15 is a table illustrating exemplary scan configuration information;

DESCRIPTION OF THE PREFERRED EMBODIMENTS

Figure 1:
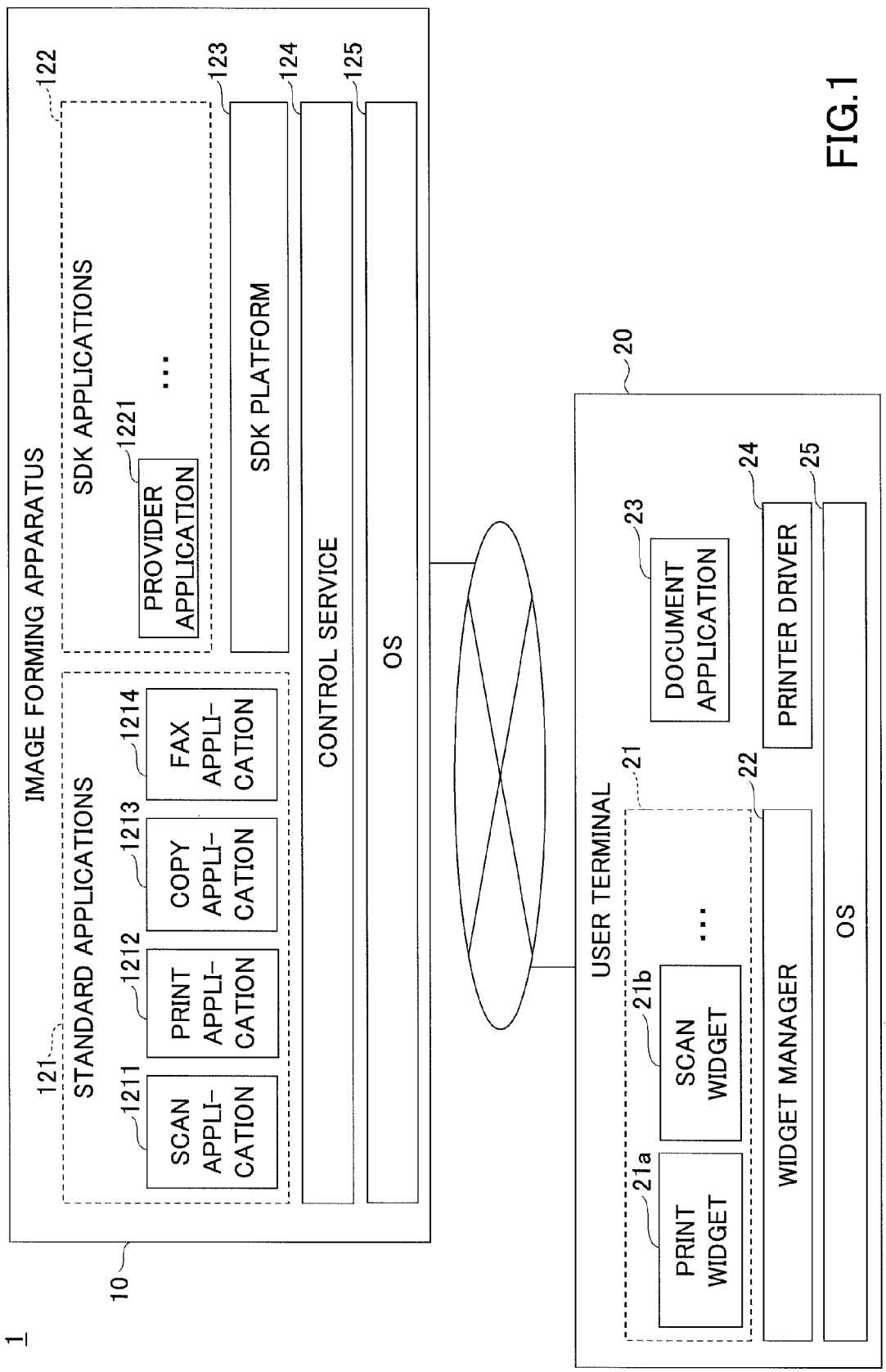
FIG. 1 is a drawing illustrating an exemplary configuration of an information processing system according to an embodiment.

Preferred embodiments of the present invention are described below with reference to the accompanying drawings. FIG. 1 is a drawing illustrating an exemplary configuration of an information processing system 1 according to an embodiment. As illustrated in FIG. 1, the information processing system 1 includes one or more image forming apparatuses 10 and one or more user terminals 20 that are connected via a (wired or wireless) network such as a local area network (LAN) or the Internet. For descriptive purposes, the image forming apparatuses 10 and the user terminals 20 may be expressed in the singular form.

The image forming apparatus 10 may be, for example, a multifunction peripheral including two or more functions such as printing, scanning, copying, and facsimile transmission and reception. Alternatively, the image forming apparatus 10 may be an apparatus such as a printer, a scanner, a copier, or a facsimile machine having one function. The image forming apparatus 10 is an example of an execution apparatus.

The user terminal 20 may be implemented by any type of device that can store and execute a software program and has a communication function. For example, the user terminal 20 may be implemented by a desktop personal computer (PC), a notebook PC, a personal digital assistant (PDA), a cell phone, or a smartphone. The user terminal 20 is an example of an information processing apparatus.

An exemplary software configuration of the user terminal 20 is described below. As illustrated in FIG. 1, the user terminal 20 may include a print widget 21a, a scan widget 21b, a widget manager 22, document application 23, a printer driver 24, and an operating system (OS) 25.

The print widget 21a and the scan widget 21b are examples of application programs that are collectively called "widgets 21" (or the widget 21 in the singular form) in the present application. In these years, simple application programs are often called widgets or gadgets. In the present application, application programs that can be easily installed and used are called the widgets 21 and the term "widget" does not limit the technical scope of the application programs. The widgets 21 perform predetermined process flows (such as workflows) by using functions of (or in collaboration with) the image forming apparatus 10.

The print widget 21a requests the image forming apparatus 10 to execute a print job for print data generated for a logical printer.

The scan widget 21b requests the image forming apparatus 10 to scan a document to obtain image data and stores the obtained image data in the user terminal 20.

The widget manager 22 interfaces communications between the widgets 21 and the image forming apparatus 10. Each of the widgets 21 may include an interface and a protocol defined by the widget manager 22. In other words, the widgets 21 are application programs that operate in cooperation with the widget manager 22.

The document application 23 is software such as a word processor or a spreadsheet for creating electronic document data that can be printed. Although the document application 23 is represented by one block in FIG. 1, the document application 23 may represent two or more application programs that can create document data of various data formats.

The printer driver 24 generates print data from document data generated by the document application 23. When a logical printer corresponding to the print widget 21a is specified as a print destination, the printer driver 24 generates an intermediate file with a file name specified as the output destination of the logical printer and outputs the print data to the intermediate file.

The OS 25 is an operating system. Software programs in the user terminal 20 run as processes or threads on the OS 25.

An exemplary software configuration of the image forming apparatus 10 is described below. As illustrated in FIG. 1, the image forming apparatus 10 may include standard applications 121, SDK applications 122, an SDK platform 123, a control service 124, and an OS 125.

The standard applications 121 are default applications installed in the image forming apparatus 10 before the factory shipment. In the example of FIG. 1, the standard applications 121 include a scan application 1211, a print application 1212, a copy application 1213, and a fax application 1214. The scan application 1211 performs a scan job. The print application 1212 performs a print job. The copy application 1213 performs a copy job. The fax application 1214 performs a facsimile transmission job and a facsimile reception job.

The control service 124 is implemented by software modules that, for example, provide upper-layer applications with functions for controlling various hardware resources. The functions, for example, include a network communication function, a scanner control function, a printer control function, and a memory management function.

The SDK applications 122 are plug-in applications that are additionally installed to expand the functions of the image forming apparatus 10 after its factory shipment. In FIG. 1, a provider application 1221 is provided as an example of the SDK application 122. The provider application 1221 performs a process to enable operations of the widgets 21 from the image forming apparatus 10.

The SDK platform 123 provides an execution environment for the SDK applications 122. The SDK applications 122 are developed using application programming interfaces (API) provided by the SDK platform 123. For example, the SDK platform 123 provides the SDK applications 122 with a scan function interface, a print function interface, and a copy function interface. APIs provided by the SDK platform 123 may be made public to allow a third party to develop the SDK applications 122.

The OS 125 is an operating system. Software programs in the image forming apparatus 10 run as processes or threads on the OS 125.

Figure 2:
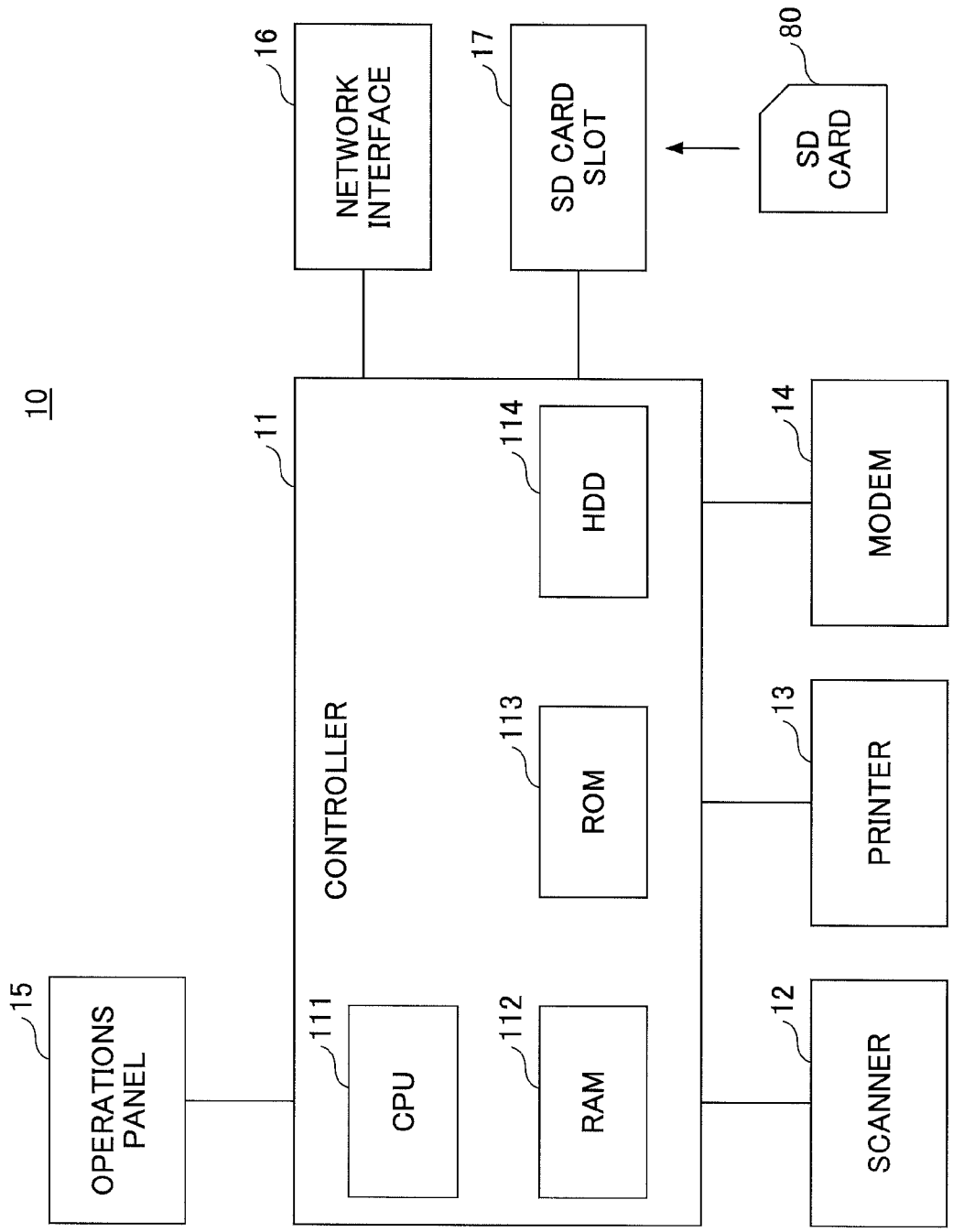
FIG. 2 is a block diagram illustrating an exemplary hardware configuration of an image forming apparatus.

Hardware configurations of the image forming apparatus 10 and the user terminal 20 are described below. FIG. 2 is a block diagram illustrating an exemplary hardware configuration of the image forming apparatus 10. As illustrated in FIG. 2, the image forming apparatus 10 may include, as hardware components, a controller 11, a scanner 12, a printer 13, a modem 14, an operations panel 15, a network interface 16, and a secure digital (SD) card slot 17.

The controller 11 includes a CPU 111, a RAM 112, a ROM 113, and an HDD 114. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs.

The scanner 12 is a hardware component for scanning a document to obtain image data. The printer 13 is a hardware component for printing print data on a recording medium such as paper. The modem 14 is a hardware component for connecting the image forming apparatus 10 to a telephone line and is used to send and receive image data for facsimile communications. The operations panel 15 is a hardware component including an input unit such as buttons for receiving user inputs and a display unit such as a liquid crystal display panel. The network interface 16 is a hardware component for connecting the image forming apparatus 10 to a (wired or wireless) network such as a local area network (LAN). The SD card slot 17 reads, for example, programs stored in a secure digital (SD) card 80. With the image forming apparatus 10 configured as described above, in addition to the programs stored in the ROM 113 and the HDD 114, programs stored in the SD card 80 can be loaded into the RAM 112 and executed. Instead of the SD card 80, any other storage medium (e.g., a CD-ROM or a universal serial bus (USB) memory) may be used for this purpose. That is, a storage medium that can be mounted on the image forming apparatus 10 is not limited to the SD card 80. When a storage medium other than the SD card 80 is used, the SD card slot 17 may be replaced with a hardware component corresponding to the storage medium used.

Figure 3:
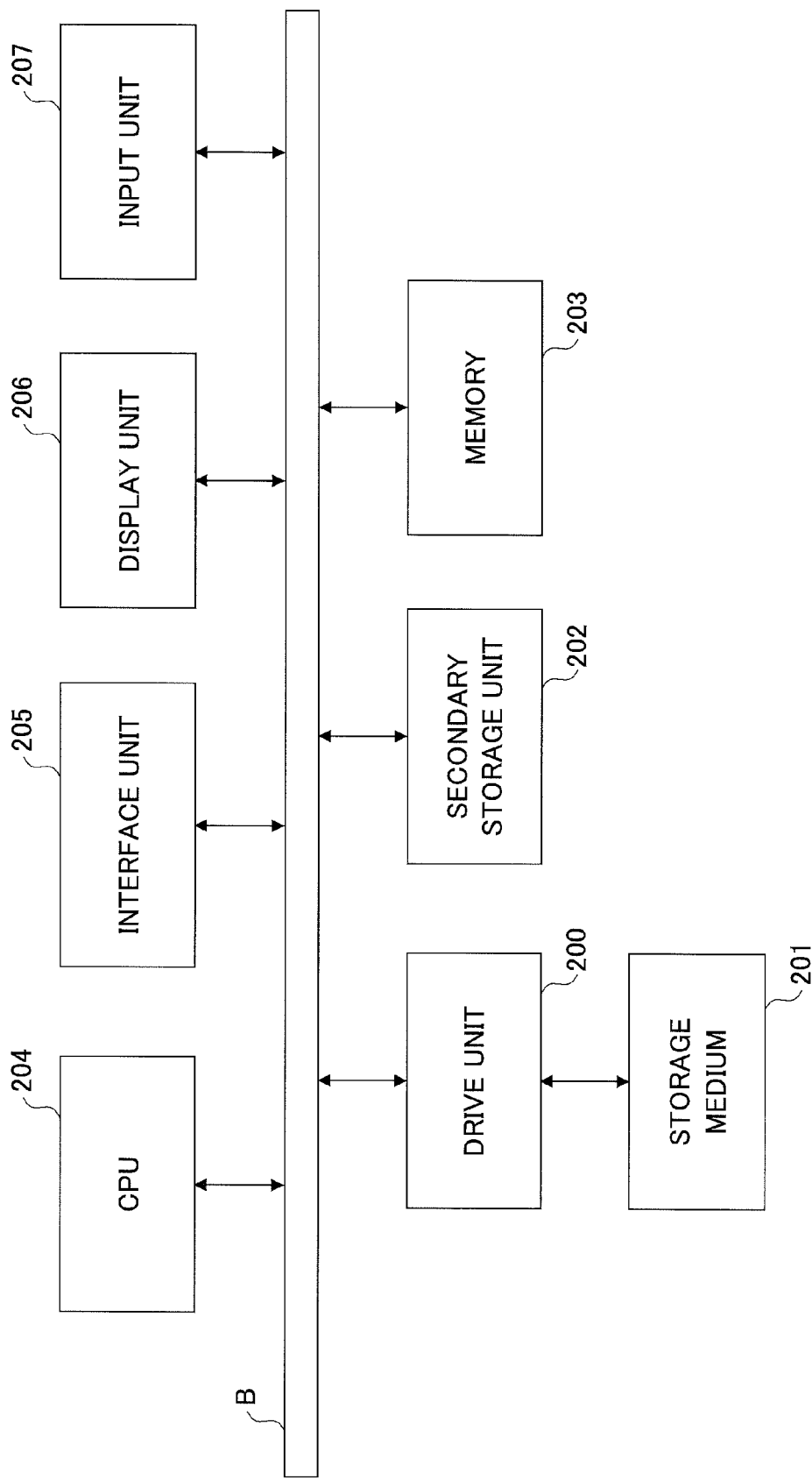
FIG. 3 is a block diagram illustrating an exemplary hardware configuration of a user terminal.

FIG. 3 is a block diagram illustrating an exemplary hardware configuration of the user terminal 20. As illustrated in FIG. 3, the user terminal 20 may include a drive unit 200, a secondary storage unit 202, a memory 203, a CPU 204, an interface unit 205, a display unit 206, and an input unit 207 that are connected to each other via a bus B.

Programs for implementing various processes at the user terminal 20 may be provided via a storage medium 201 such as a CD-ROM or a memory card. When the storage medium 201 storing programs is mounted on the drive unit 200, the programs are read by the drive unit 200 from the storage medium 201 and are installed in the secondary storage unit 202. The programs may not necessarily be installed from the storage medium 201. Alternatively, the programs may be downloaded via a network from another computer. The secondary storage unit 202 stores the installed programs and other necessary files and data.

The memory 203 temporarily stores programs read from the secondary storage unit 202 when the programs are executed. The CPU 204 implements functions of the user terminal 20 according to the programs temporarily stored in the memory 203. The interface unit 205 provides communication interfaces such as a network interface, a universal serial bus (USB) interface, and a wireless interface (e.g., Bluetooth interface). The display unit 206 displays, for example, graphical user interfaces (GUI) output by the programs. The input unit 207 includes, for example, a keyboard, a pointing device such as a mouse, and/or buttons for receiving user inputs.

Figure 4:
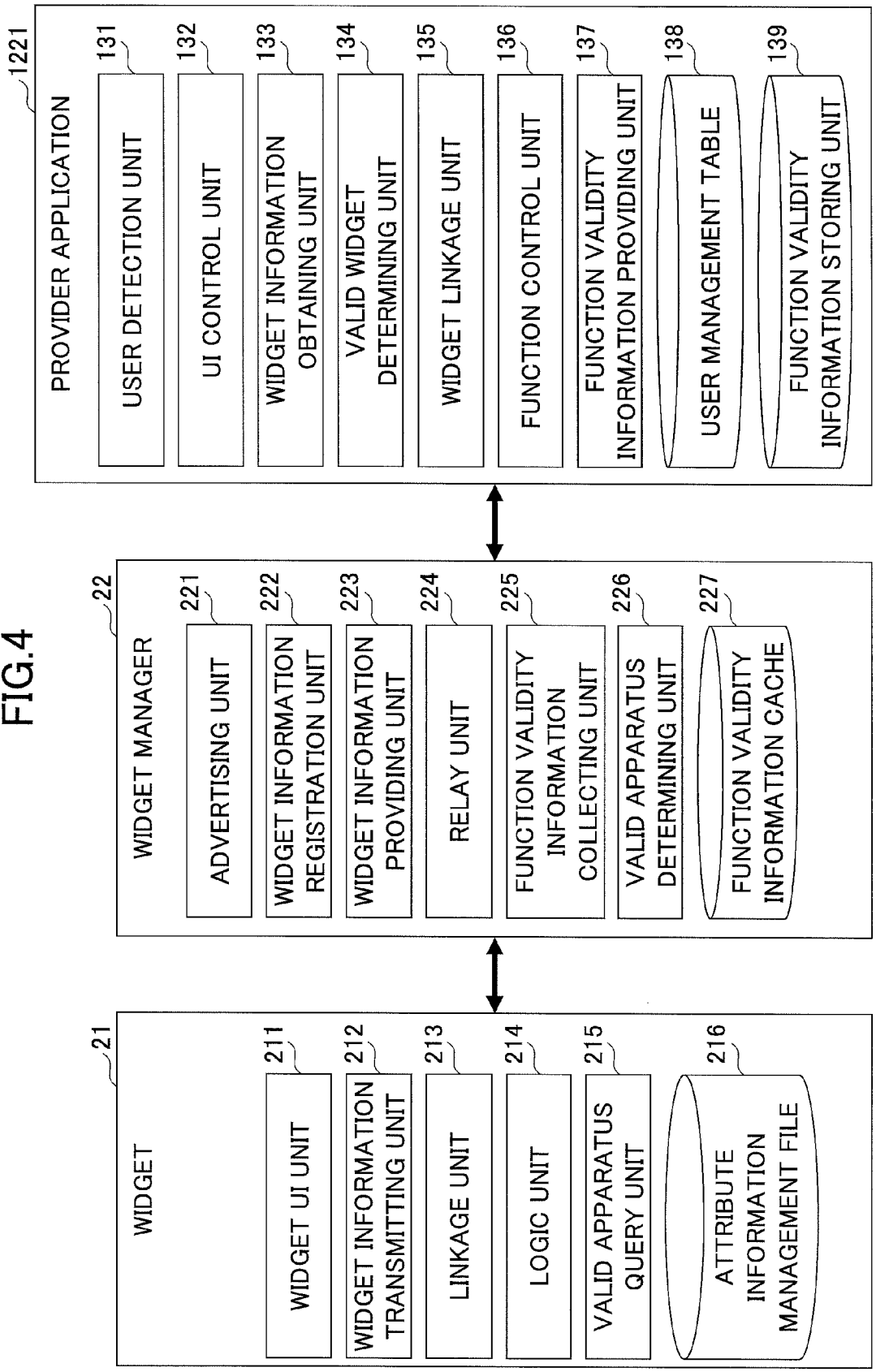
FIG. 4 is a block diagram illustrating exemplary functional configurations of a widget, a widget manager, and a provider application according to an embodiment.

The widget 21, the widget manager 22, and the provider application 1221 are described below in more detail. FIG. 4 is a block diagram illustrating exemplary functional configurations of the widget 21, the widget manager 22, and the provider application 1221 according to the present embodiment.

As illustrated in FIG. 4, the widget 21 may include a widget UI unit 211, a widget information transmitting unit 212, a linkage unit 213, a logic unit 214, a valid apparatus query unit 215, and an attribute information management file 216.

The widget UI unit 211 controls various display and input operations (or processes) related to the widget 21. The widget information transmitting unit 212 sends a widget information registration request requesting registration of widget information (attribute information of the widget 21) to the widget manager 22 when the widget 21 is started. The widget information may include identification information (hereafter referred to as linked function identifiers) of functions (hereafter called linked functions) of the image forming apparatus 10 which are used by the widget 21. The linked functions are functions that need to be included in the image forming apparatus 10 that collaborates with the widget 21. In other words, the linked functions are functions that the widget 21 requests the image forming apparatus 10 to execute.

The linkage unit 213 controls communications (e.g., transmission and reception of information) for collaboration with the provider application 1221. The attribute information management file 216 contains attribute information of the widget 21. The attribute information includes configuration information of the widget 21. The configuration information includes parameters that define a behavior of the widget 21 or a job performed by the widget 21. The logic unit 214 implements functions unique to the widget 21. For example, the logic unit 214 of the print widget 21a performs a process for requesting the image forming apparatus 10 to execute a print job based on print data generated for the corresponding logical printer. Meanwhile, the logic unit 214 of the scan widget 21b performs a process for storing scanned image data. The valid apparatus query unit 215 queries the widget manager 22 about image forming apparatuses 10 (hereafter referred to as "valid apparatuses") where a function to be used by the widget 21 is valid or available (i.e., image forming apparatuses 10 including that function), and causes the display unit 206 to display the query result.

In the descriptions below, "a" may be attached to the end of the reference numbers of the components of the print widget 21a and "b" may be attached to the end of the reference numbers of the components of the scan widget 21b to distinguish between them. For example, the logic unit 214 of the print widget 21a may be expressed as "logic unit 214a".

The widget manager 22 may include an advertising unit 221, a widget information registration unit 222, a widget information providing unit 223, a relay unit 224, a function validity information collecting unit 225, a valid apparatus determining unit 226, and a function validity information cache 227.

The advertising unit 221 advertises (broadcasts or multicasts), for example, a user ID of a logged-in user who has logged into the user terminal 20 via the network when the widget manager 22 is started. The advertisement is issued for each user (for each user ID). Accordingly, the advertisement issued by the advertising unit 221 is used to report to the image forming apparatus 10 new entry of a user allowed to use a widget 21.

The widget information registration unit 222 receives a widget information registration request including widget information from the widget 21, and stores the widget information in, for example, the secondary storage unit 202.

The widget information providing unit 223, in response to a request from the image forming apparatus 10, provides (sends) the widget information stored in the secondary storage unit 202 to the image forming apparatus 10. The relay unit 224 relays communications between the widget 21 and the provider application 1221.

The function validity information collecting unit 225 obtains (or collects), from each image forming apparatus 10, information (hereafter referred to as "function validity information") indicating functions that are valid (or available) in the image forming apparatus 10. The function validity information collecting unit 225 stores the obtained function validity information in the function validity information cache 227. Here, "valid" functions of an image forming apparatus 10 indicate, for example, functions that the image forming apparatus 10 include. In other words, when a function is valid in an image forming apparatus 10, the image forming apparatus 10 includes software and/or hardware components for implementing the function. "Valid" functions of an image forming apparatus 10 may change dynamically according to the status of the image forming apparatus 10. That is, a "valid" function may be defined as a function that is included and also available (or executable) in the image forming apparatus 10. For example, a function is deemed available (or executable) when software and hardware components of the image forming apparatus 10 for implementing the function are in normal conditions (i.e., when no error that prevents execution of the function is present in the image forming apparatus 10).

When receiving a query from a widget 21, the valid apparatus determining unit 226 determines a valid apparatus(es) for the widget 21 by referring to the function validity information cache 227. The function validity information cache 227 may be implemented, for example, by a storage area of the secondary storage unit 202 or the memory 203.

The provider application 1221 may include a user detection unit 131, a UI control unit 132, a widget information obtaining unit 133, a valid widget determining unit 134, a widget linkage unit 135, a function control unit 136, a function validity information providing unit 137, a user management table 138, and a function validity information storing unit 139.

The user detection unit 131 detects a user (or the user terminal 20) allowed to use the widget 21 based on the advertisement issued by the widget manager 22 and registers, for example, a user ID included in the advertisement in the user management table 138. The user management table 138 is used to manage a list of users who are allowed to use the widgets 21 on the network and may be stored, for example, in the HDD 114.

The UI control unit 132 receives user inputs for operating the widgets 21. Thus, although the widgets 21 are stored in the user terminal 20, they can also be operated via the operations panel 15 of the image forming apparatus 10.

The widget information obtaining unit 133 obtains, from the widget manager 22, the widget information of the widgets 21 that belong to a user (user ID) selected from the users (user IDs) registered in the user management table 138.

The valid widget determining unit 134 determines, using the function validity information storing unit 139, whether each of the widgets 21, whose widget information has been obtained by the widget information obtaining unit 133, is valid in the image forming apparatus 10. When the image forming apparatus 10 includes all linked functions requested by a widget 21 (i.e., functions that the widget 21 uses), the widget 21 is deemed valid.

The function validity information storing unit 139 stores function validity information indicating functions that are valid (or available) in the image forming apparatus 10. The function validity information storing unit 138 may be implemented by, for example, a storage area of the HDD 114.

The widget linkage unit 135 controls communications with the widget manager 22. The function control unit 136 controls execution of functions requested by the widgets 21. Actual processes for providing the functions are performed by the standard applications 121 and the SDK applications 122 other than the provider application 1221. The function validity information providing unit 137 sends function validity information stored in the function validity information storing unit 139 to the widget manager 22 in response to a request from the widget manager 22.

Exemplary processes in the information processing system 1 are described below. Before using a widget 21, the user starts the widget manager 22 on the user terminal 20 and starts the widget 21. An exemplary process performed when the widget manager 22 and the widget 21 are started is described below.

Figure 5:
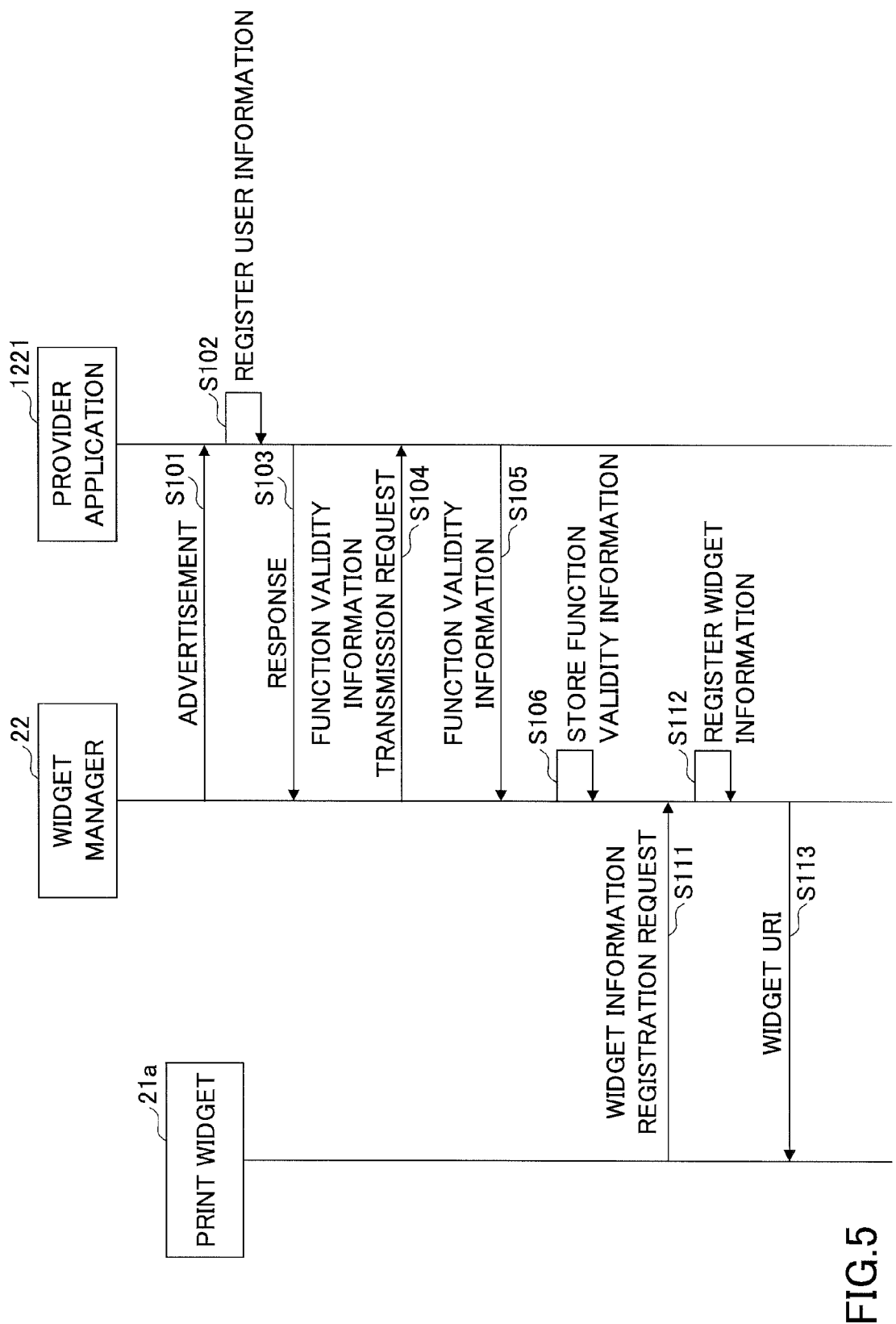
FIG. 5 is a sequence chart illustrating an exemplary process performed when a widget manager and a widget are started.

FIG. 5 is a sequence chart illustrating an exemplary process performed when the widget manager 22 and the print widget 21a are started.

When the widget manager 22 is started by the user or automatically, the advertising unit 221 of the widget manager 22 sends (or issues) an advertisement including a user ID of a logged-in user and a widget manager URI (uniform resource identifier) via the network (S101). The widget manager URI is an URI that is unique to the widget manager 22. In the present embodiment, it is assumed that one widget manager 22 is started on one user terminal 20. Therefore, the widget manager URI also serves as identification information of the user terminal 20.

When receiving the advertisement, the user detection unit 131 of each image forming apparatus 10 registers the user ID and the widget manager URI (user information) contained in the advertisement in the user management table 138 (S102).

FIG. 6 illustrates an exemplary configuration of the user management table 138. As illustrated in FIG. 6, the user management table 138 stores user IDs in association with widget manager URIs.

When multiple users start the widget managers 22 on their respective user terminals 20, multiple records for those users are registered in the user management table 138 of the image forming apparatus 10.

Next, the user detection unit 131 sends a response to the advertisement to the user terminal 20 (or the widget manager 22) that has sent the advertisement (S103). The response may include identification information such as an IP address for identifying the image forming apparatus 10 in network communications. Since the advertisement may be received by plural image forming apparatuses 10, responses may be sent to the user terminal 20 from the plural image forming apparatuses 10.

When the user terminal 20 receives a response to the advertisement, the function validity information collecting unit 225 of the widget manager 22 sends a function validity information transmission request requesting function validity information to the image forming apparatus 10 that has sent the response. Here, the image forming apparatus 10 that has sent the response may be identified based on the identification information contained in the response.

When the image forming apparatus 10 receives the function validity information transmission request, the function validity information providing unit 137 of the provider application 1221 sends the function validity information stored in the function validity information storing unit 139 to the requesting user terminal 20 (the function validity information collecting unit 225 of the widget manager 22) (S105).

FIG. 7 illustrates an exemplary configuration of function validity information stored in the function validity information storing unit 139. As illustrated in FIG. 7, the function validity information includes function identifiers, setting names, setting values, and validity indicators (validity information). The validity indicators are provided for the respective function identifiers and the respective combinations of the setting names and the setting values (i.e., configurations).

The function identifiers are identification information of functions of the image forming apparatus 10. In this example, the function validity information includes a function identifier "scan" indicating the scanning function and a function identifier "print" indicating the printing function. A validity indicator specified for a function identifier indicates whether the corresponding function (the scanning function or the printing function) is valid (available). In other words, a validity indicator specified for a function identifier indicates whether the image forming apparatus 10 includes the corresponding function. In FIG. 7, "O" indicates that the function is valid and "X" indicates that the function is invalid.

The setting names are the names of settings (or parameters) related to a function indicated by the corresponding function identifier. The setting values are values of the settings indicated by the corresponding setting names. A validity indicator specified for a combination of a setting name and a setting value indicates whether the setting value is valid for the setting indicated by the setting name. In other words, a validity indicator specified for a combination of a setting name and a setting value indicates whether the setting value can be specified for the setting indicated by the setting name. In FIG. 7, "O" indicates that the combination is valid and "X" indicates that the combination is invalid.

In FIG. 7, a row (or record) including a function identifier (and a validity indicator) is followed by rows (records) that include combinations of setting names and setting values related to the function indicated by the function identifier and validity indicators for the combinations. Accordingly, records in a range indicated by "A" in FIG. 7 indicate the validity (or availability) of the combinations of setting names and setting values related to the scanning function; and records in a range indicated by "B" in FIG. 7 indicate the validity (or availability) of the combinations of setting names and setting values related to the printing function.

In the present embodiment, respective combinations of setting names and setting values provided for the corresponding functions (e.g., the printing function and the scanning function) in the function validity information storing unit 139 are treated as separate functions in the narrow sense. For example, a combination of the setting name "color" and the setting value "full color" for the scanning function may be treated as a full-color scanning function. Similarly, a combination of the setting name "color" and the setting value "grayscale" may be treated as a grayscale scanning function.

In the example of FIG. 7, the function validity information stored in the function validity information storing unit 139 includes even invalid combinations of setting names and setting values. Alternatively, the function validity information may include only valid combinations of setting names and setting values.

Also, the function validity information stored in the function validity information storing unit 139 may be updated according to changes in the status of the image forming apparatus 10. That is, the function validity information may be updated based on whether the respective functions are available (or executable) at the image forming apparatus 10. In this case, the function validity information collecting unit 225 can obtain function validity information of functions that are actually available at the image forming apparatus 10. Alternatively, the function validity information providing unit 137 may be configured to determine the status of the image forming apparatus 10, to update function validity information obtained from the function validity information storing unit 139 based on the determined status, and to send the updated function validity information to the widget manager 22.

When receiving the function validity information, the function validity information collecting unit 225 of the widget manager 22 stores the received function validity information in the function validity information cache 227 in association with the identification information of the image forming apparatus 10 that has sent the function validity information (S106).

FIG. 8 is a table illustrating an exemplary configuration of information stored in the function validity information cache 227. As illustrated in FIG. 8, the function validity information cache 227 stores an apparatus ID, an IP address, and function validity information for each image forming apparatus 10.

The apparatus ID is an identifier of the image forming apparatus 10. For example, the apparatus ID may be sent from the image forming apparatus 10 together with the function validity information in step S105 described above. The IP address is an Internet Protocol address assigned to the image forming apparatus 10. Since the image forming apparatus 10 can be identified by the IP address, the apparatus ID may be omitted. The function validity information is sent from the image forming apparatus 10 in step S105 described above. In FIG. 8, the configuration of the function validity information is simplified for brevity. However, the function validity information stored in the function validity information cache 227 may have substantially the same configuration as that illustrated in FIG. 7.

The process performed when the widget manager 22 is started is completed by step S106.

After the widget manager 22 is started, the user starts the print widget 21a or the scan widget 21b on the user terminal 20. In the descriptions below, it is assumed that the user starts the print widget 21a.

When the print widget 21a is started, the widget information transmitting unit 212a of the print widget 21a sends a widget information registration request requesting registration of the widget information of the print widget 21a to the widget manager 22 (S111).

FIG. 9 illustrates exemplary widget information of the print widget 21a. As illustrated in FIG. 9, the widget information of the print widget 21a includes a widget ID, a linked function identifier, and a display name.

The widget ID is identification information for uniquely identifying the print widget 21a. The linked function identifier is identification information of a function that is used by the print widget 21a. The print widget 21a causes (or requests) the image forming apparatus 10 to perform printing, i.e., uses the printing function of the image forming apparatus 10. Therefore, in this example, "print" indicating the printing function is specified as the linked function identifier of the print widget 21a. The display name is a character string to be displayed as the name of the print widget 21a. The widget information is obtained, for example, from the attribute information management file 216a.

The widget information sent from the widget information transmitting unit 212a of the print widget 21a is received by the widget information registration unit 222 of the widget manager 22. The widget information registration unit 222 generates a URI including the widget ID in the received widget information, and stores (or registers) the widget information in the secondary storage unit 202 in association with the generated URI (S112). The URI is called a "widget URI" and is generated for each widget 21 when its widget information is registered. The widget URI may be generated, for example, by attaching the widget ID to the end of the widget manager URI. As described above, the widget manager URI is unique to the widget manager 22 (i.e., to the user terminal 20). Therefore, when the print widgets 21a are started on multiple user terminals 20, different widget URIs are generated for the print widgets 21a on the respective user terminals 20. This means that it is possible to identify a print widget 21*a* (of a user terminal 20) on the network based on the widget URI.

Next, the widget information registration unit 222 sends the widget URI generated in step S112 to the widget information transmitting unit 212*a* of the print widget 21*a* (S113). When receiving the widget URI, the widget information transmitting unit 212*a* stores (or records) the widget URI in the memory 203 for the print widget 21*a*. Also, the widget UI unit 211*a* displays an icon of the started print widget 21*a* on the display unit 206 of the user terminal 20.

Through the above process, the print widget 21*a* is registered in the widget manager 22.

Although the print widget 21*a* is used in the exemplary process described above, a similar process (particularly steps S111 through S113 in FIG. 5) may be performed when the scan widget 21*b* (or any other widget 21) is started. Since one widget manager 22 is started on one user terminal 20, it is not necessary to repeat steps S101 through S106 in FIG. 5 every time a widget 21 is started.

For example, when the scan widget 21*b* is started, the widget information transmitting unit 212*b* of the scan widget 21*b* sends the widget information of the scan widget 21*b* to the widget manager 22 (S111).

FIG. 10 illustrates exemplary widget information of the scan widget 21*b*. As illustrated in FIG. 10, items (or fields) constituting the widget information of the scan widget 21*b* are the same as those of the widget information of the print widget 21*a* in FIG. 9, except that their values are different.

In FIG. 10, the widget ID is identification information of the scan widget 21*b*. Since the scan widget 21*b* uses the scanning function of the image forming apparatus 10, "scan" indicating the scanning function is specified as the linked function identifier of the scan widget 21*b*. The display name is a character string to be displayed as the name of the scan widget 21*b*.

When receiving the widget information as illustrated in FIG. 10, the widget manager 22 generates a widget URI for the scan widget 21*b* and sends the widget URI to the scan widget 21*b*. When receiving the widget URI, the widget information transmitting unit 212*b* stores (or records) the widget URI in the memory 203 for the scan widget 21*b*. Also, the widget UI unit 211*b* displays an icon of the started scan widget 21*b* on the display unit 206 of the user terminal 20.

The widget information of the widget 21 is an example of a function execution request for requesting execution of a function of the image forming apparatus 10. Here, the widget information does not include information identifying one of the image forming apparatuses 10 where the function specified by the linked function identifier is to be executed. That is, the widget information registration unit 222 of the widget manager 22 receives the function execution request from the widget 21 (or from the user starting the widget 21) with no identifier of the image forming apparatus 10 where the function is to be executed.

Figure 11:
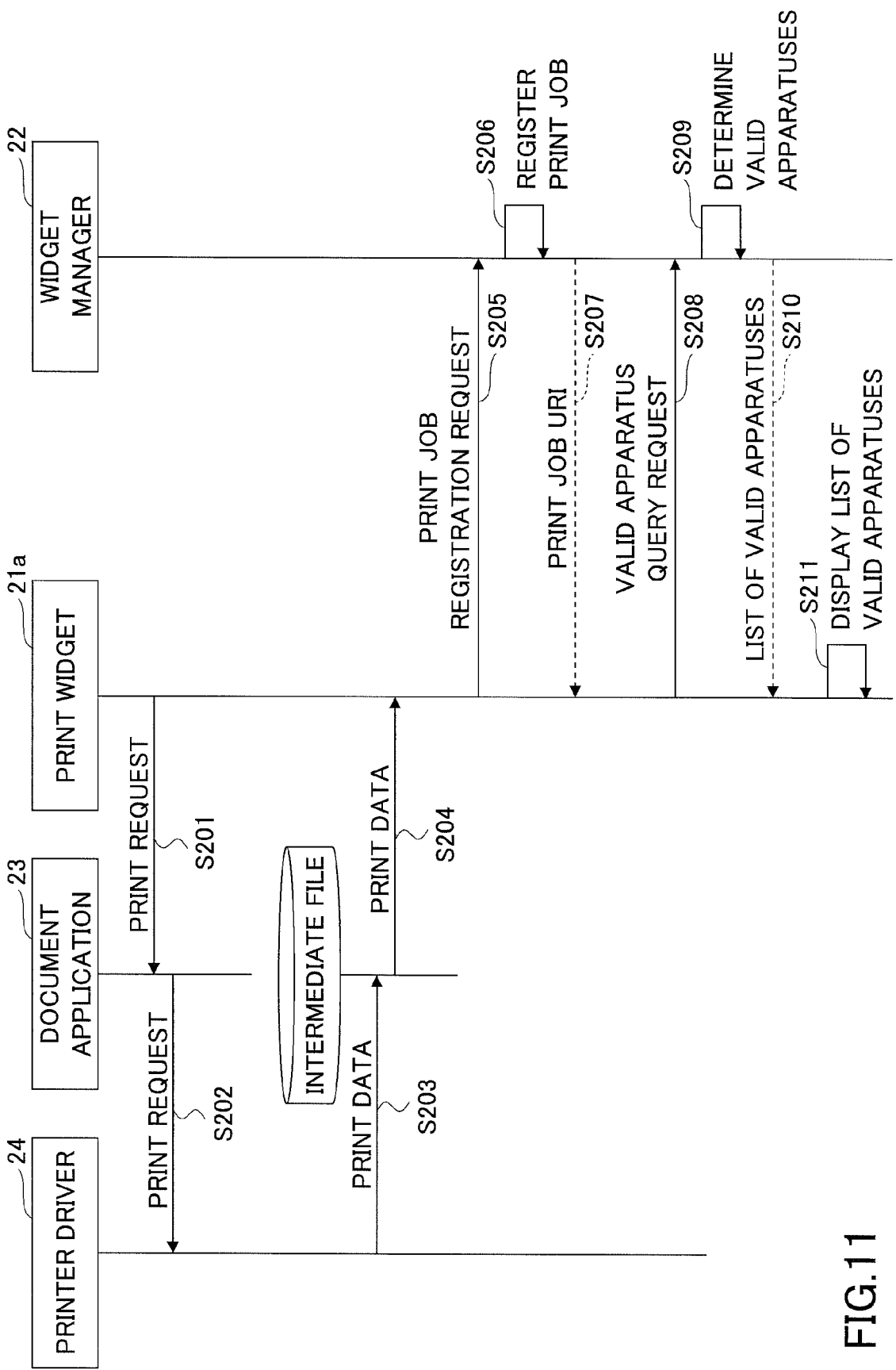
FIG. 11 is a sequence chart illustrating an exemplary process performed by a print widget to enter a print job.

Next, an exemplary process of entering a print job by the print widget 21*a* is described. FIG. 11 is a sequence chart illustrating an exemplary process of entering a print job by the print widget 21*a*.

For example, when an icon of a document file to be printed is dragged and dropped on the icon of the print widget 21*a*, the logic unit 214*a* of the print widget 21*a* inputs a command, which is a print request to the document application 23, to the OS 25 (S201). In this case, the file name of the dragged-and-dropped document file is specified as an argument of the command. As a result, the document application 23 is started in the background. When started, the document application 23 inputs a print request for the document file to the printer driver 24 (S202). In response to the print request, the printer driver 24 generates print data (e.g., page description language (PDL) data) of the document file. When a logical printer corresponding to the print widget 21*a* is specified as the print destination, the printer driver 24 generates an intermediate file with a predetermined file name that is specified as the output destination of the logical printer, and outputs the print data to the intermediate file (S203).

Meanwhile, after the print widget 21*a* is started, the logic unit 214*a* waits for generation of the intermediate file with the predetermined file name. More specifically, the print widget 21*a* "polls" (i.e., checks the presence of) a file with the predetermined file name in a predetermined folder to determine whether the intermediate file is generated. When the generation of the intermediate file is detected, the print widget 21*a* reads the print data from the intermediate file (S204).

Next, the linkage unit 213*a* sends a print job registration request for requesting registration of a print job to the widget manager 22 (S205). The print job registration request may include print configuration information recorded, for example, in the attribute information management file 216*a* and the print data obtained from the intermediate file. Also, the widget URI for the print widget 21*a* is specified in the print job registration request.

FIG. 12 illustrates exemplary print configuration information for the print widget 21*a*. As illustrated in FIG. 12, the print configuration information includes combinations of setting names and setting values. The setting names are the names of settings (or parameters) constituting the print configuration information. The setting values are values of the settings indicated by the corresponding setting names. In the example of FIG. 12, "2in1" is specified for a "layout" setting, "duplex" is specified for a "print mode" setting, and "grayscale" is specified for a "color" setting. The "layout" setting specifies the layout of images (or pages) on a recording medium (e.g., paper). Here, "2in1" indicates that two pages are laid out on one side of the recording medium. The "print mode" setting specifies whether duplex printing or single-side printing is performed. The "color" setting specifies the print color mode such as "full color" or "grayscale".

The print job registration request sent in step S205 from the linkage unit 213*a* of the print widget 21*a* is received by the widget information registration unit 222 of the widget manager 22. The widget information registration unit 222 generates a URI (print job URI) for identifying the print job, whose registration is requested by the print job registration request, based on the widget URI specified in the print job registration request; and registers (or records) the print job (i.e., the print data and the print configuration information) in the secondary storage unit 202 in association with the generated print job URI (S206). The print job URI may be generated, for example, by attaching an identifier unique to the print job to the end of the widget URI. Next, the widget information registration unit 222 sends the print job URI to the linkage unit 213*a* of the print widget 21*a* (S207).

The print job of the print widget 21*a* is also an example of a function execution request for requesting execution of a function of the image forming apparatus 10. Similarly to the widget information, the print job (i.e., the print data and the print configuration information) does not include identification information of the image forming apparatus 10 where the print job is to be executed.

Next, the valid apparatus query unit 215*a* of the print widget 21*a* specifies the print job URI in a valid apparatus query request for querying valid apparatuses, and sends the valid apparatus query request to the widget manager 22

(S208). In response to the valid apparatus query request, the valid apparatus determining unit 226 of the widget manager 22 determines valid apparatuses for the print job (S209). More specifically, the valid apparatus determining unit 226 extracts, from the function validity information cache 227, one or more sets of function validity information that include the function identifier corresponding to the linked function identifier (i.e., "print") in the widget information associated with the widget URI of the print widget 21a. Next, the valid apparatus determining unit 226 selects one or more of the extracted sets of function validity information where all combinations of settings (or setting names) and setting values constituting the print configuration information in the print job are valid. Here, the print job is stored in the secondary storage unit 202 in association with the print job URI specified in the valid apparatus query request. Then, the valid apparatus determining unit 226 determines image forming apparatuses 10 corresponding to the apparatus IDs or the IP addresses in the selected sets of function validity information as valid apparatuses. The valid apparatus determining unit 226 records the determination result (i.e., a list of valid apparatuses) in, for example, the memory 203 in association with the print job URI. The list of valid apparatuses includes, for example, a list of apparatus IDs or IP addresses of the valid apparatuses.

Next, the valid apparatus determining unit 226 sends the list of valid apparatuses to the valid apparatus query unit 215a (S210). When receiving the list of valid apparatuses, the valid apparatus query unit 215a causes the display unit 206 to display a screen (valid apparatus list screen) including the list of valid apparatuses (S211).

Figure 13:
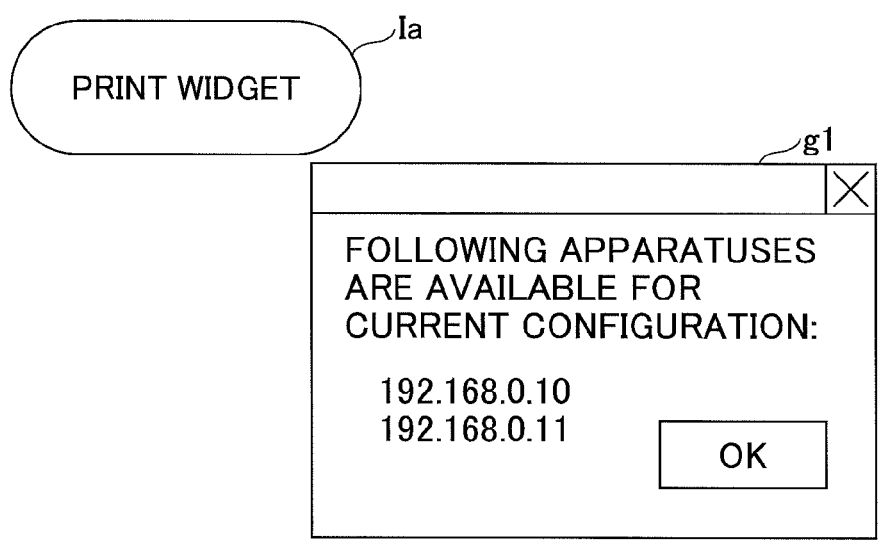
FIG. 13 is a drawing illustrating an exemplary valid apparatus list screen.

FIG. 13 is a drawing illustrating an exemplary valid apparatus list screen. In the example of FIG. 13, a valid apparatus list screen g1 is displayed near an icon Ia of the print widget 21a. On the valid apparatus list screen g1, a list of IP addresses of valid apparatuses for the registered print job (i.e., the image forming apparatuses 10 that can execute the print job). From the viewpoint of the user, the valid apparatus list screen g1 is displayed when an icon of a document file is dragged and dropped on the icon Ia. The user refers to the valid apparatus list screen g1 to determine the image forming apparatuses 10 that can execute the print job.

If it is difficult for the user to identify the image forming apparatuses 10 based on the IP addresses, information that enables the user to identify the image forming apparatuses 10 may be displayed instead of or in addition to the IP addresses. For example, location information (e.g., pillar numbers or positions on a floor) indicating the locations of the image forming apparatuses 10 may be displayed on the valid apparatus list screen g1. For this purpose, correspondence information indicating the correspondence between the location information and the IP addresses or apparatus IDs of the image forming apparatuses 10 may be provided. In this case, the valid apparatus query unit 215 may be configured to convert the IP addresses or apparatus IDs into the location information based on the correspondence information, and to display the location information on the valid apparatus list screen g1.

After step S211, the print widget 21a resumes polling the intermediate file. If an icon of another document file is dragged and dropped on the icon of the print widget 21a, a print job for the document file is also registered in the widget manager 22. Accordingly, two or more print jobs for one print widget 21a may be registered in one widget manager 22. In this case, the widget manager 22 generates multiple print job URIs based on one widget URI, and records the print jobs in association with the print job URIs.

Next, an exemplary process of registering scan configuration information for a scan job by the scan widget 22b is described. This registration process corresponds to the process (print job entering process) performed by the print widget 21a to enter a print job. However, unlike the print job entering process, a scan job is entered at the image forming apparatus 10 because it is necessary to set a document on the image forming apparatus 10 before entering the scan job. In other words, the scan widget 22b does not enter the scan job itself, but registers configuration information (scan configuration information) for the scan job in the widget manager 22.

Figure 14:
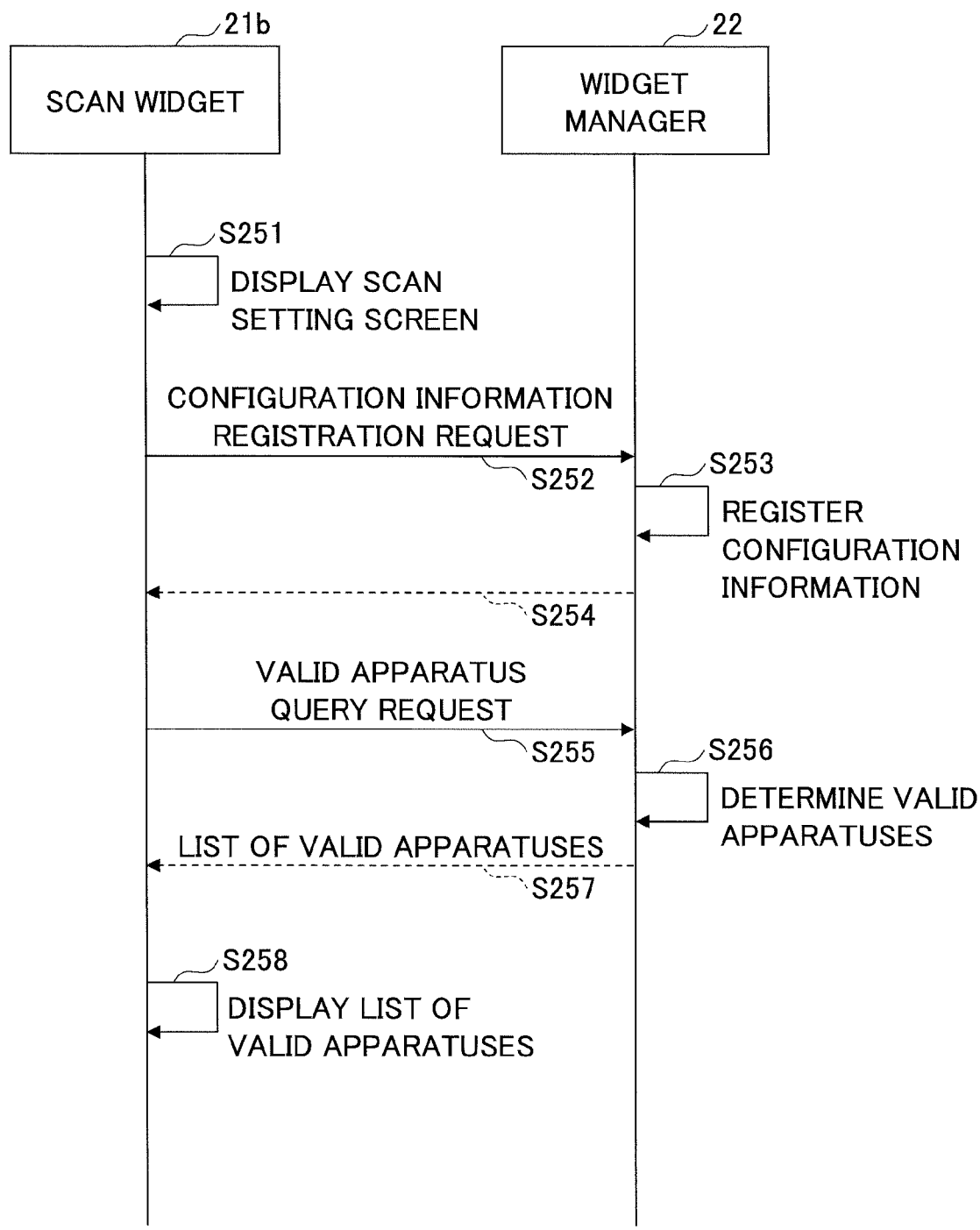
FIG. 14 is a sequence chart illustrating an exemplary process performed by a scan widget to register scan configuration information for a scan job.

FIG. 14 is a sequence chart illustrating an exemplary process performed by the scan widget 21b to register scan configuration information for a scan job.

When, for example, the icon of the scan widget 21b displayed on the display unit 206 by the widget UI unit 211b is selected (clicked, double-clicked, etc.), the widget UI unit 211b displays a screen (hereafter called a scan setting screen) for setting the scan configuration information on the display unit 206 (S251). Here, default values for the scan configuration information may be displayed on the scan setting screen. The default values may be stored in the attribute information management file 216b.

When the scan configuration information is set on the scan setting screen and a command indicating the completion of the setting process is entered, the logic unit 214b of the scan widget 21b sends a scan configuration information registration request to the widget manager 22 (S252). The scan configuration information registration request includes the set scan configuration information and the widget URI of the scan widget 21b.

FIG. 15 illustrates exemplary scan configuration information. As illustrated in FIG. 15, the scan configuration information includes combinations of setting names and setting values. The setting names are the names of settings (or parameters) constituting the scan configuration information. The setting values are values of the settings indicated by the corresponding setting names. In the example of FIG. 15 "duplex" is specified for a "scan mode" setting, "full color" is specified for a "color" setting, and "400" (dpi) is specified for a "resolution" setting. The "scan mode" setting specifies whether one or two sides of a document are scanned. The "color" setting specifies the scan color mode such as "full color" or "grayscale". The "resolution" setting specifies the resolution at which a document is scanned.

The scan configuration information registration request sent in step S252 from the logic unit 214b of the scan widget 21b is received by the widget information registration unit 222 of the widget manager 22. The widget information registration unit 222 stores the scan configuration information in, for example, the secondary storage unit 202 in association with the widget URI specified in the received scan configuration information registration request (S253). As a result, the scan configuration information for the scan job of the scan widget 22b is registered in the widget manager 22. Next, the widget information registration unit 222 sends a response to the linkage unit 213b of the scan widget 21b (S254).

The valid apparatus query unit 215b of the scan widget 21b specifies the widget URI of the scan widget 21b in a valid apparatus query request for querying valid apparatuses, and sends the valid apparatus query request to the widget manager 22 (S255). In response to the valid apparatus query request, the valid apparatus determining unit 226 of the widget manager 22 determines valid apparatuses for the scan job (S256). More specifically, the valid apparatus determining unit 226 extracts, from the function validity information cache 227, one or more sets of function validity information that include the function identifier corresponding to the linked function identifier (i.e., "scan") in the widget information associated with the widget URI of the scan widget 21b. Next, the valid apparatus determining unit 226 selects one or more of the extracted sets of function validity information where all combinations of settings (or setting names) and setting values constituting the scan configuration information are valid. Here, the scan configuration information is stored in the secondary storage unit 202 in association with the widget URI specified in the valid apparatus query request. Then, the valid apparatus determining unit 226 determines image forming apparatuses 10 corresponding to the apparatus IDs or the IP addresses in the selected sets of function validity information as valid apparatuses. The valid apparatus determining unit 226 records the determination result (i.e., a list of valid apparatuses) in, for example, the memory 203 in association with the widget URI.

Next, the valid apparatus determining unit 226 sends the list of valid apparatuses (i.e., the apparatus IDs or the IP addresses of the valid apparatuses) to the valid apparatus query unit 215b (S257). When receiving the list of valid apparatuses, the valid apparatus query unit 215b causes the display unit 206 to display a screen (valid apparatus list screen) including the list of valid apparatuses (S258). The user refers to the valid apparatus list screen to determine the image forming apparatuses 10 that can execute the scan widget 21b.

After entering a print job in the widget manager 22 via the print widget 21a or registering scan configuration information for a scan job in the widget manager 22 via the scan widget 22b, the user moves to a location where the image forming apparatus 10 is installed to execute the print job or the scan job. Here, when plural image forming apparatuses 10 are connected to the network, the same advertisement is received by the plural image forming apparatuses 10, and information in the advertisement is registered in the user management tables 138 of the respective image forming apparatuses 10. In this case, the user can execute the print job or the scan job on any one of the image forming apparatuses 10 that include a printing function or a scanning function and are determined to be the valid apparatuses based on the print configuration information or the scan configuration information. Accordingly, the user moves to one of the image forming apparatuses 10 whose identification information (IP addresses or apparatus IDs) is displayed on the valid apparatus list screen.

Figure 16:
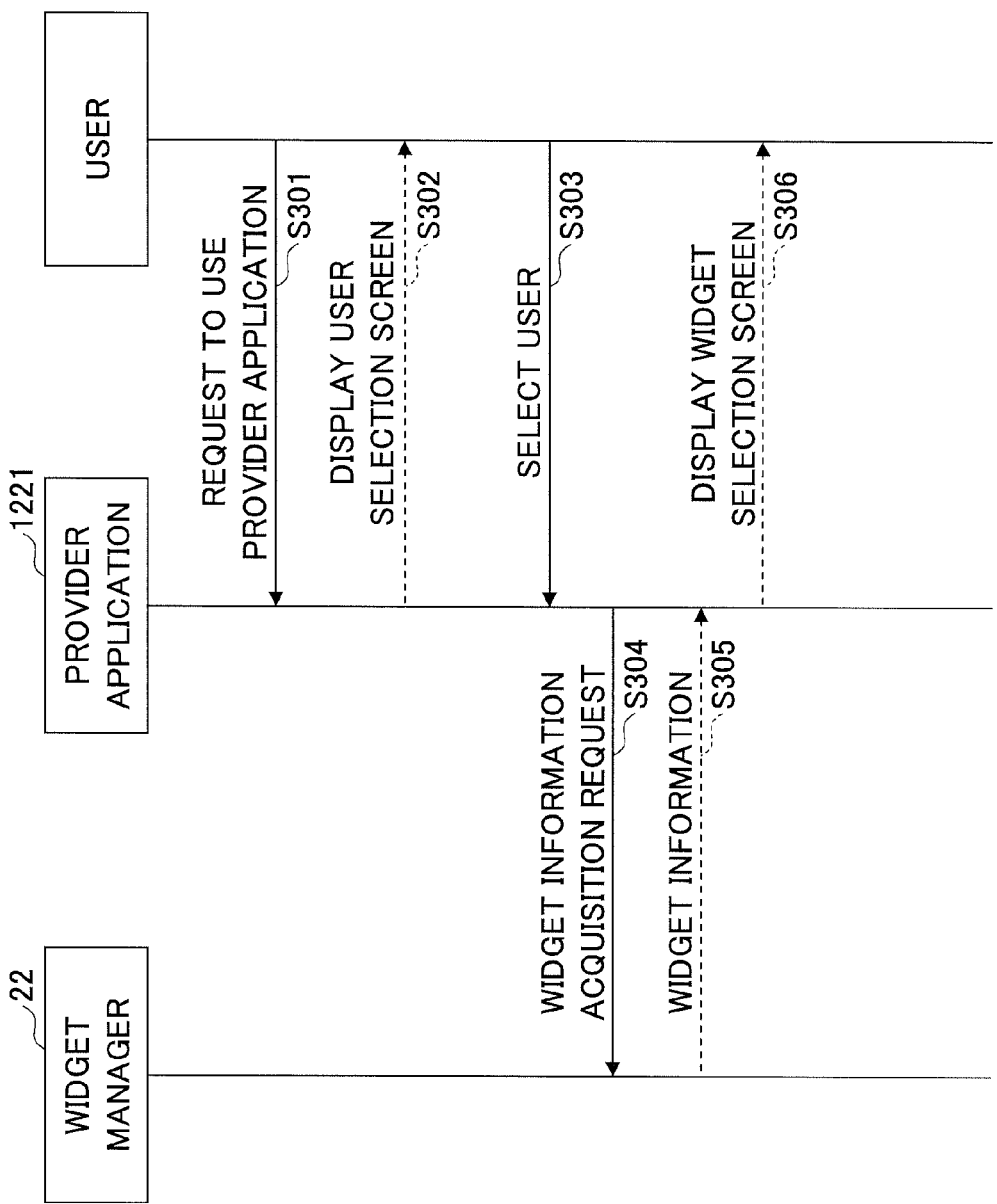
FIG. 16 is a sequence chart illustrating an exemplary process of displaying a list of executable widgets.

Next, a process performed according to user operations at the image forming apparatus 10 is described. FIG. 16 is a sequence chart illustrating a process of displaying a list of executable widgets.

When the user inputs a request (or command) to use the provider application 1221 (or widgets 21) via the operations panel 15 of a "selected" image forming apparatus 10 (which is selected and being operated by the user) (S301), the UI control unit 132 of the provider application 1221 displays a user selection screen on the operations panel 15 based on information registered in the user management table 138 (S302).

Figure 17:
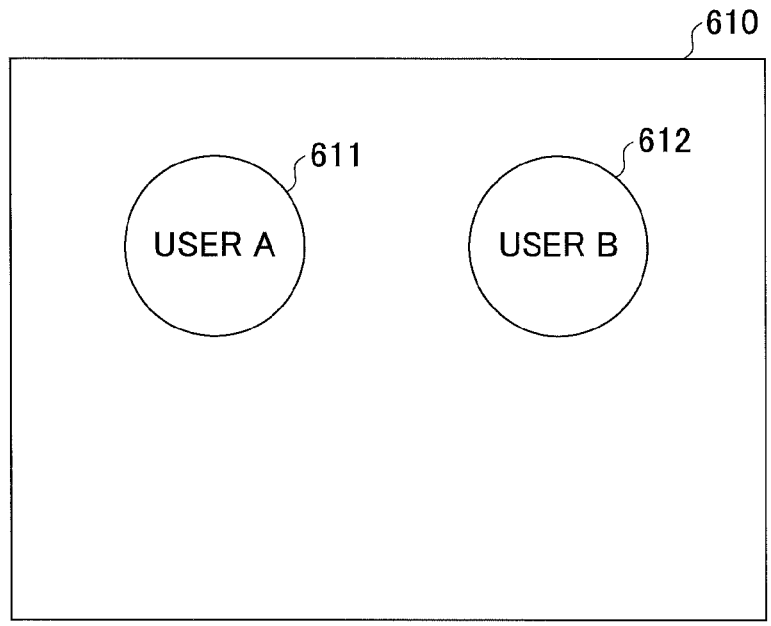
FIG. 17 is a drawing illustrating an exemplary user selection screen.

FIG. 17 illustrates an exemplary user selection screen 610. The user selection screen 610 includes buttons for respective user IDs. In this example, a button 611 for user A and a button 612 for user B are displayed on the user selection screen 610.

On the user selection screen 610, the user selects and presses one of the buttons corresponding to its own user ID (S303). When a button is pressed, the widget information obtaining unit 133 retrieves, from the user management table 138, a widget manager URI corresponding to the user ID associated with the pressed button.

Next, the widget information obtaining unit 133 sends a widget information acquisition request to the retrieved widget manager URI (S304). Hereafter, the image forming apparatus 10 sending the widget information acquisition request may be referred to as the requesting image forming apparatus 10. The widget information acquisition request is received by the widget information providing unit 223 of the widget manager 22 of the user terminal 20 corresponding to the user ID. In response, the widget information providing unit 223 obtains sets of widget information recorded in the secondary storage unit 202, and sends (or returns) the sets of widget information to the provider application 1221 (S305). For example, assuming that one print widget 21a and one scan widget 21b have been started on the user terminal 20, the widget information providing unit 223 sends the widget information of the print widget 21a and the widget information of the scan widget 21b to the provider application 1221. Here, the widget URIs of the corresponding widgets 21 are attached to the sets of widget information sent by the widget information providing unit 223 to the provider application 1221. The UI control unit 132 of the provider application 1221 stores the sets of widget information received from the widget manager 22 in the RAM 112.

As described above, the widget information is an example of a function execution request for requesting the image forming apparatus 10 to execute a function. Also, the operation performed in step S303 is an example of a reception instruction to receive widget information (i.e., a function execution request) from the widget manager 22 (or the user terminal 20). Further, step S305 is an example of sending a function execution request when a reception instruction to receive the function execution request is entered.

After step S305, the UI control unit 132 of the provider application 1221 receives the sets of widget information and displays, based on the sets of widget information, a screen (widget selection screen) including options (e.g., buttons, icons, or any other types of objects) representing the widgets 21 on the operations panel 15 (S306).

Figure 18:
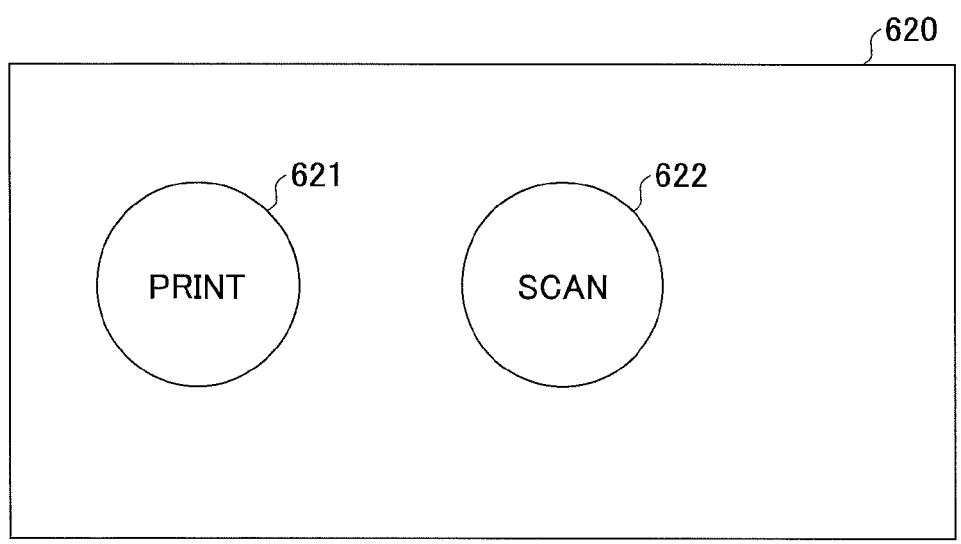
FIG. 18 is a drawing illustrating an exemplary widget selection screen.

FIG. 18 illustrates an exemplary widget selection screen 620. On the widget selection screen 620, a button 621 for selecting the print widget 21a and a button 622 for selecting the scan widget 21b are displayed.

Here, in response to the widget information acquisition request sent in step S304, the widget information providing unit 223 of the widget manager 22 may return only sets of widget information associated with widget URIs that are associated with the requesting image forming apparatus 10 as a valid apparatus. In this case, the widget information acquisition request may include the apparatus ID or the IP address of the requesting image forming apparatus 10. The widget information providing unit 223 identifies sets of widget information associated with widget URIs that are associated with lists of valid apparatuses that include the apparatus ID or the IP address specified in the widget information acquisition request, and returns the identified sets of widget information to the provider application 1221. Here, in the case of the print widget 21a, the list of valid apparatuses is associated with a print job URI instead of the widget URI. Therefore, the widget information of the print widget 21a may be returned unconditionally in response to the widget information acquisition request. Alternatively, the widget information of the print widget 21a may be returned when the requesting image forming apparatus 10 is valid for at least one of print jobs registered for the print widget 21a. In this case, the widget information of the print widget 21a is not returned when the requesting image forming apparatus 10 is invalid for all print jobs registered for the print widget 21a.

With the above configuration where only the widget information of widgets 21 for which the requesting image forming apparatus 10 is valid is returned, it is possible to display buttons, on the widget selection screen 620, only for the widgets 21 that are valid on the image forming apparatus 10.

One problem with the above configuration is that it is difficult for the user to determine whether a widget 21, whose button is not displayed, has not been normally registered in the widget manager 22 or the widget 21 is invalid on the image forming apparatus 10. That is, the user cannot determine the reason why the button is not displayed.

To solve this problem, the widget information providing unit 223 of the widget manager 22 may be configured to return the lists of valid apparatuses associated with the widget URIs (or print job URIs) together with the widget information in response to the widget information acquisition request sent in step S304. In this case, the UI control unit 132 of the provider application 1221 determines whether the image forming apparatus 10 is a valid apparatus based on the list of valid apparatuses received for each set of widget information (or each widget 21). More specifically, the UI control unit 132 determines whether the list of valid apparatuses includes the apparatus ID or the IP address of the image forming apparatus 10. Based on the determination result, the UI control unit 132 displays the button of a valid widget 21 for which the image forming apparatus 10 is a valid apparatus and the button of an invalid widget 21 for which the image forming apparatus 10 is not a valid apparatus in different manners. For example, the button of an invalid widget 21 may be dimmed (or grayed) and made unavailable (or not selectable). With this configuration, the user can determine that a widget 21 corresponding to a dimmed button has been normally registered in the widget manager, but is invalid on the selected image forming apparatus 10.

Instead of the list of valid apparatuses, information indicating whether the image forming apparatus 10 is valid for the function related to widget information may be returned together with the widget information. In this case, the widget information providing unit 223 determines whether the apparatus ID or the IP address of the requesting image forming apparatus 10 is included in the list of valid apparatuses associated with the widget URI of the widget information. Based on the determination result, the widget information providing unit 223 sends, together with the widget information, information indicating whether the image forming apparatus 10 is valid for the function related to the widget information. Also in this case, the UI control unit 132 may be configured to display the button of a valid widget 21 for which the image forming apparatus 10 is a valid apparatus and the button of an invalid widget 21 for which the image forming apparatus 10 is not a valid apparatus in different manners.

When a widget 21 (or the corresponding button) is selected on the widget selection screen 620 displayed in step S306 of FIG. 16, a process corresponding to the selected widget 21 (the print widget 21a or the scan widget 21b) is performed. Below, processes performed when the print widget 21a and the scan widget 21b are selected are described separately. In the descriptions below, it is assumed that a button for an invalid widget 21 that is invalid on the selected image forming apparatus 10 is also displayed on the widget selection screen 620. The button for the invalid widget 21 may be dimmed or displayed in a normal manner.

Figure 19:
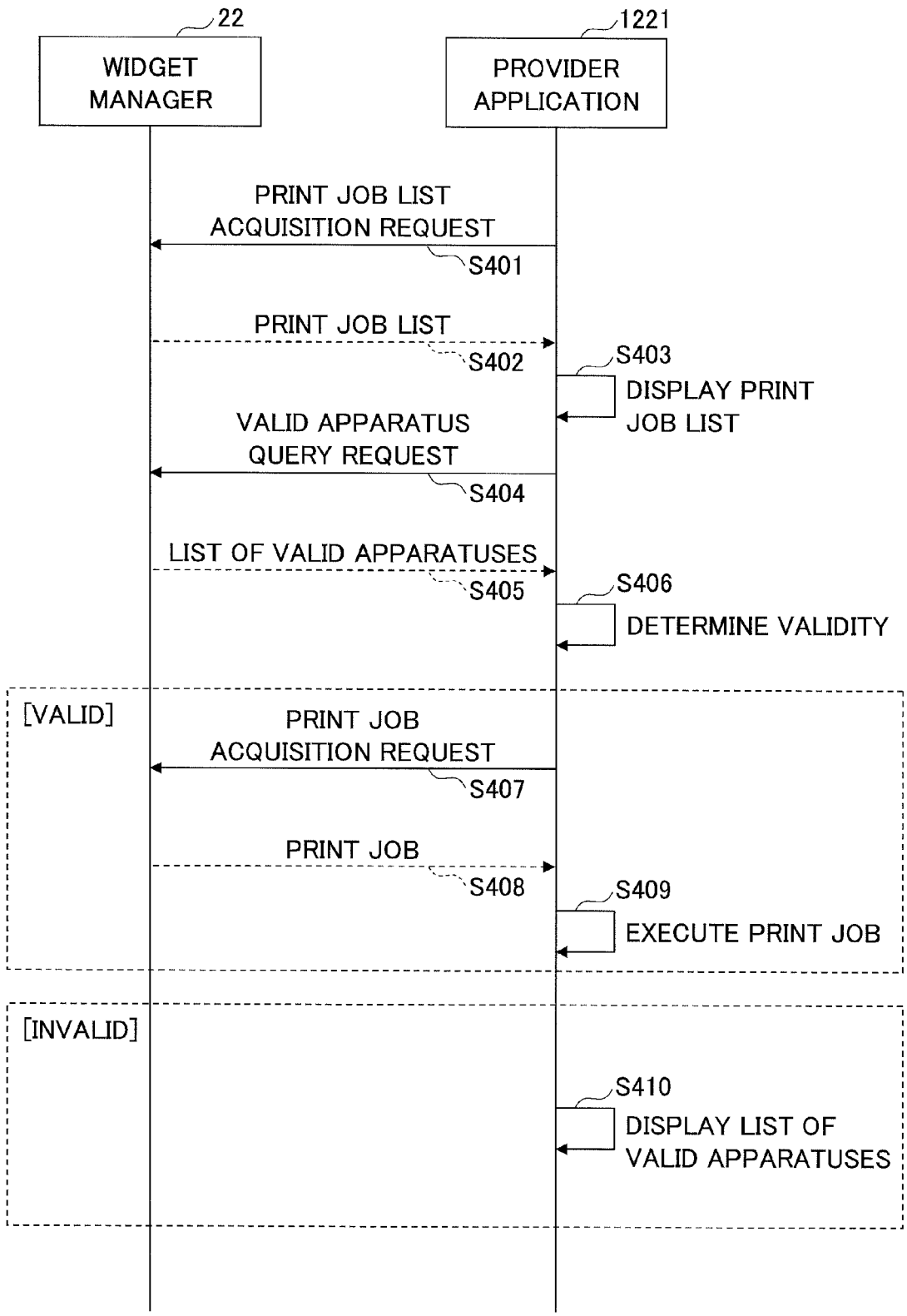
FIG. 19 is a sequence chart illustrating an exemplary process performed when a print widget is executed.

FIG. 19 is a sequence chart illustrating an exemplary process performed when the print widget 21a is selected (or executed).

When the button 621 corresponding to the print widget 21a is selected on the widget selection screen 620 of FIG. 18, the widget linkage unit 135 determines, based on the linked function identifier "print" in the widget information corresponding to the button 621, that a print job is to be executed. Then, the widget linkage unit 135 sends a print job list acquisition request including a widget URI associated with the widget information to the widget manager 22 corresponding to the widget URI (S401).

The print job list acquisition request is received by the relay unit 224 of the widget manager 22. In response, the relay unit 224 generates a print job list including a print job URI, a job name, and print configuration information for each of print jobs recorded in the secondary storage unit 202 in association with the widget URI specified in the print job list acquisition request, and sends the print job list to the widget linkage unit 135 (S402). The job name may be, for example, the name of a document file to be printed in the print job. The relay unit 224 may be configured to include, in the print job list, only the information on print jobs corresponding to the widget URI that is associated with a list of valid apparatuses including the identification information of the requesting image forming apparatus 10. Alternatively, the relay unit 224 may be configured to include lists of valid apparatuses for the respective print job URIs in the print job list.

When the widget linkage unit 135 of the provider application 1221 receives the print job list, the UI control unit 132 displays a list of job names in the print job list on the operations panel 15 (S403). When a job name of a print job to be executed is selected by the user from the displayed list, the valid widget determining unit 134 sends a valid apparatus query request to the print job URI associated with the selected job name (S404). The valid apparatus query request is received by the relay unit 224 of the widget manager 22. In response, the relay unit 224 sends a list of valid apparatuses associated with the print job URI (S405). When the list of valid apparatuses associated with the print job URI is included in the print job list received in step S402, steps S404 and S405 may be omitted.

Next, the valid widget determining unit 134 determines whether the print job corresponding to the selected job name is valid on the image forming apparatus 10 (S406). More specifically, the valid widget determining unit 134 determines whether the list of valid apparatuses for the print job includes the apparatus ID or the IP address of the image forming apparatus 10.

When the print job corresponding to the selected job name is valid, the print job is executed in steps S407 through S409.

In step S407, the widget linkage unit 135 sends a print job acquisition request including the print job URI associated with the selected job name to the widget manager 22 corresponding to the print job URI.

The print job acquisition request is received by the relay unit 224 of the widget manager 22. In response, the relay unit 224 obtains the print job (print data) stored in the secondary storage unit 202 in association with the print job URI specified in the print job acquisition request, and sends the obtained print job to the widget linkage unit 135 of the provider application 1221 (S408).

When receiving the print job, the widget linkage unit 135 inputs the print job in the function control unit 136. The function control unit 136 requests the print application 1212 to execute the input print job (S409). As a result, an image is printed by the printer 13 on a recording medium (e.g., paper) based on the print data of the print job, and the recording medium is output from the printer 13.

Meanwhile, when the print job corresponding to the selected job name is invalid, the valid widget determining unit 134 displays a screen (valid apparatus report screen) for reporting the list of valid apparatuses for the print job on the operations panel 15 (S410).

Figure 20:
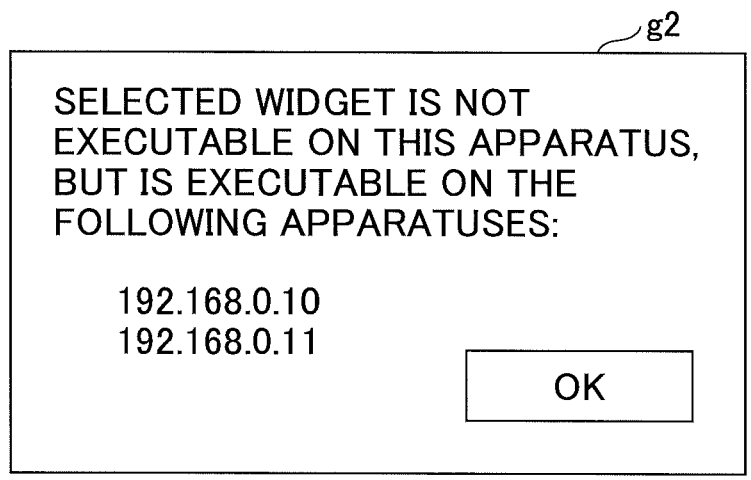
FIG. 20 is a drawing illustrating an exemplary valid apparatus report screen.

FIG. 20 is a drawing illustrating an exemplary valid apparatus report screen g2. As illustrated in FIG. 20, the valid apparatus report screen g2 includes a list of IP addresses of valid apparatuses for the print job corresponding to the selected job name. With the valid apparatus report screen g2, the user can determine that the print job is not executable on the selected image forming apparatus 10 and obtain information on image forming apparatuses 10 that can execute the print job.

Instead of the IP addresses, any other type of information that enables the user to identify image forming apparatuses 10 may be displayed on the valid apparatus report screen g2.

Next, an exemplary process performed when the scan widget 21b is selected on the widget selection screen 620 is described.

Figure 21:
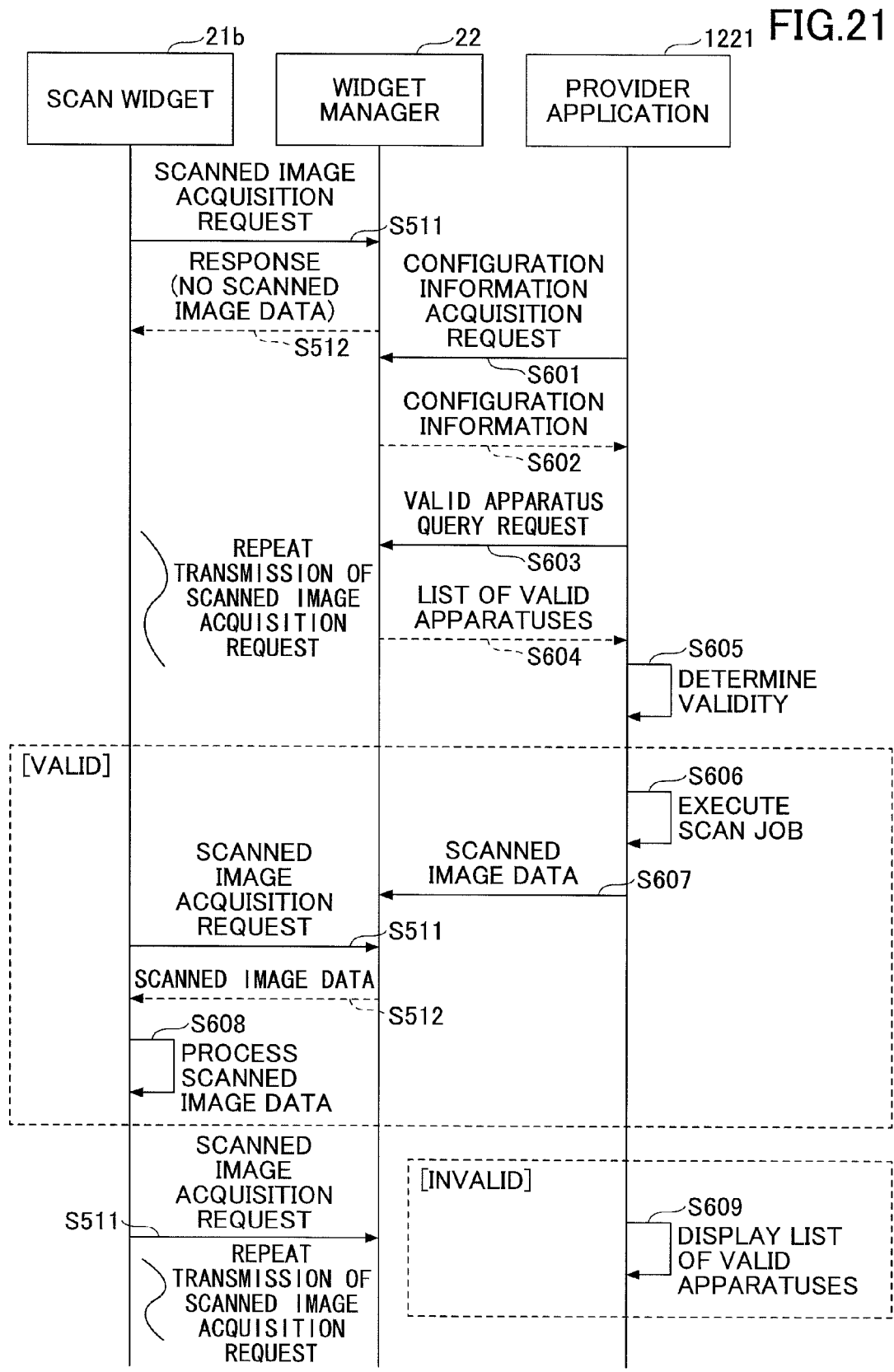
FIG. 21 is a sequence chart illustrating an exemplary process performed when a scan widget is executed.

FIG. 21 is a sequence chart illustrating an exemplary process performed when the scan widget 21b is selected (or executed). In this exemplary process, it is assumed that a button corresponding to the scan widget 21b is displayed on the widget selection screen 620.

When a document is set on the image forming apparatus 10 and a button corresponding to the scan widget 21b is selected on the widget selection screen 620, the widget linkage unit 135 of the provider application 1221 determines that a scan job is to be executed based on the linked function identifier "scan" in the widget information (hereafter called "current widget information") corresponding to the selected button. Then, the widget linkage unit 135 sends a configuration information acquisition request (for requesting scan configuration information) including a widget URI associated with the current widget information to the widget manager 22 corresponding to the widget URI (S601).

The configuration information acquisition request is received by the relay unit 224 of the widget manager 22. In response, the relay unit 224 sends, to the widget linkage unit 135, the scan configuration information stored in the secondary storage unit 202 in association with the widget URI specified in the configuration information acquisition request (S602).

Next, the valid widget determining unit 134 of the provider application 1221 sends a valid apparatus query request to the widget URI of the scan widget 21b (S603). The valid apparatus query request is received by the relay unit 224 of the widget manager 22. In response, the relay unit 224 sends a list of valid apparatuses associated with the widget URI (S604). When lists of valid apparatuses are received together with the widget information in step S305 of FIG. 16, steps S603 and S604 may be omitted.

Next, the valid widget determining unit 134 determines whether the scan widget 21b is valid on the image forming apparatus 10 (S605). More specifically, the valid widget determining unit 134 determines whether the list of valid apparatuses for the scan widget 21b includes the apparatus ID or the IP address of the image forming apparatus 10.

When the scan widget 21b is valid, the scan job is executed in steps S606 through S608.

The widget linkage unit 135 inputs the scan configuration information received in step S602 to the function control unit 136. The function control unit 136 requests the scan application 1211 to execute the scan job based on the scan configuration information (S606). The scan application 1211 causes the scanner 12 to scan the document set on the image forming apparatus 10 to obtain image data (scanned image data), and outputs the scanned image data to the widget linkage unit 135.

Next, the widget linkage unit 135 sends the scanned image data to the widget URI associated with the current widget information (S607). The scanned image data sent to the widget URI is received by the relay unit 224 of the widget manager 22 corresponding to the widget URI.

Meanwhile, after sending the widget information, the scan widget 21b performs polling to determine whether scanned image data has been obtained by the image forming apparatus 10 and waits for reception of the scanned image data. More specifically, the linkage unit 213b of the scan widget 21b sends a scanned image acquisition request including the corresponding widget URI to the relay unit 224 of the widget manager 22 (S511). The relay unit 224 transmits a response to the scanned image acquisition request (S512).

When receiving the scanned image acquisition request (S511) (after receiving the scanned image data), the relay unit 224 sends the scanned image data associated with the widget URI specified in the scanned image acquisition request to the linkage unit 213b of the scan widget 21b (S512).

When receiving the scanned image data, the linkage unit 213b inputs the scanned image data to the logic unit 214b. The logic unit 214b performs a predefined process (logic) implemented therein on the scanned image data (S608). More specifically, the logic unit 214b generates a file in a folder specified in the attribute information management file 216b and outputs the scanned image data to the generated file. Then, the linkage unit 213b resumes transmission of the scanned image acquisition request (i.e., resumes polling) in preparation for the next execution of the scan widget 21b (S511) and waits for reception of scanned image data.

Meanwhile, when the scan widget 21b is invalid, the valid widget determining unit 134 displays a screen (valid apparatus report screen) for reporting the list of valid apparatuses for the scan job on the operations panel 15 (S609). The valid apparatus report screen displayed in step S609 may be substantially the same as the valid apparatus report screen g2 of FIG. 20. With the valid apparatus report screen, the user can determine that the scan widget 21b is not executable on the selected image forming apparatus 10 and obtain information on image forming apparatuses 10 that can execute the scan widget 21b.

A variation of a process performed in step S410 of FIG. 19 or step S609 of FIG. 21 is described below.

Figure 22:
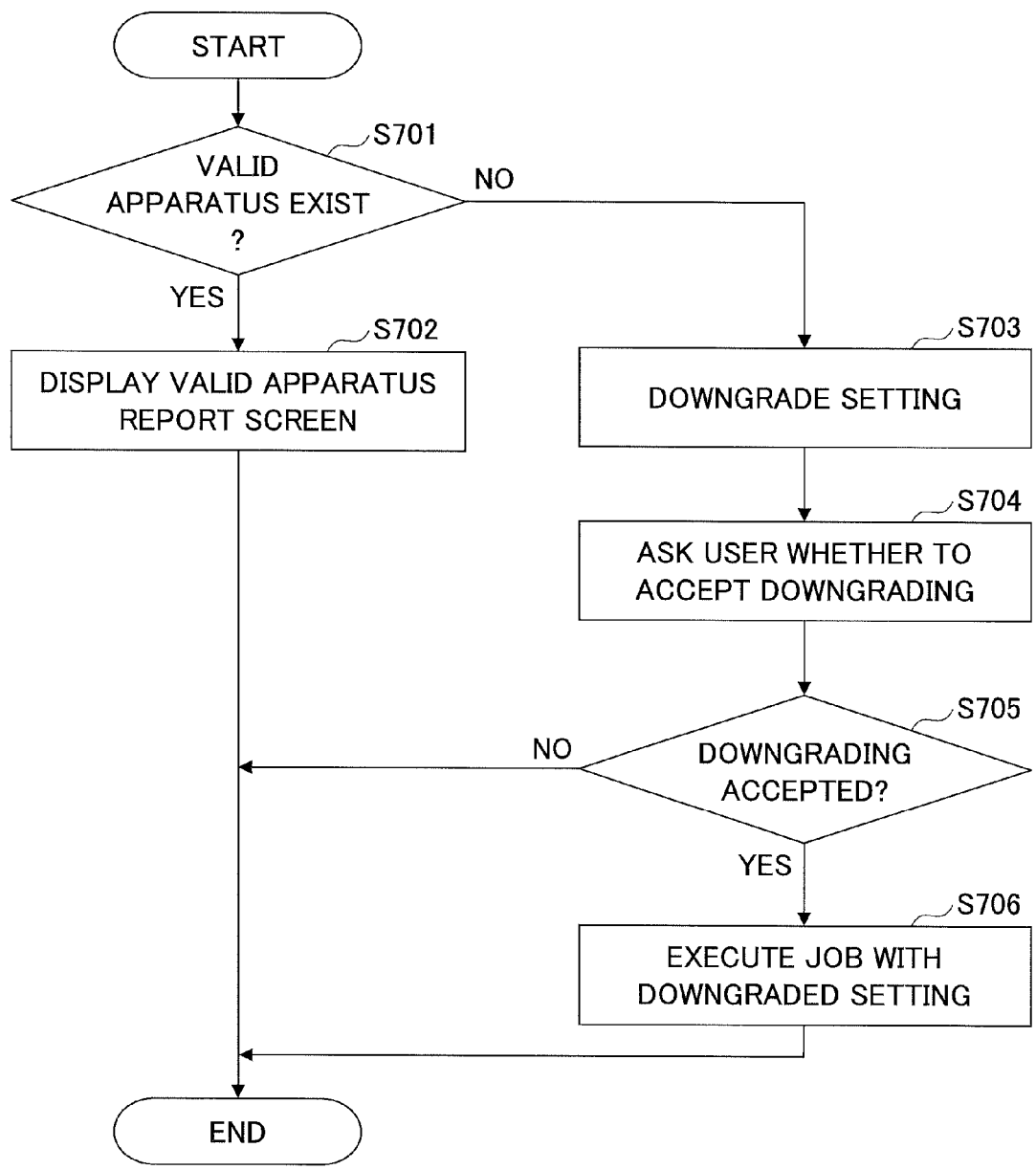
FIG. 22 is a flowchart illustrating a variation of a process performed when a selected image forming apparatus is not a valid apparatus.

FIG. 22 is a flowchart illustrating a variation of a process performed when a selected image forming apparatus is not a valid apparatus. In FIG. 22, a selected print job or a selected scan widget 21b is referred to as a "current job".

In step S701, the valid widget determining unit 134 determines whether any valid apparatus exists for the current job based on the list of valid apparatuses received for the current job. More specifically, the valid widget determining unit 134 determines whether the list of valid apparatuses includes the apparatus ID or IP address of at least one image forming apparatus 10.

When at least one valid apparatus exists for the current job (YES in S701), the valid widget determining unit 134 displays the valid apparatus report screen (see, for example, FIG. 20) on the operations panel 15 (S702).

Meanwhile, when no valid apparatus exists for the current job (NO in S701), the valid widget determining unit 134 "downgrades" the configuration information of the current job such that the image forming apparatus 10 can execute the current job (S703). That is, the valid widget determining unit 134 changes one or more setting values in the configuration information that are not supported by the image forming apparatus 10 to values supported by the image forming apparatus 10.

Next, the valid widget determining unit 134 displays a screen (downgrading confirmation screen) on the operations panel 15 to ask the user whether to accept the downgrading of the configuration information (S704).

Figure 23:
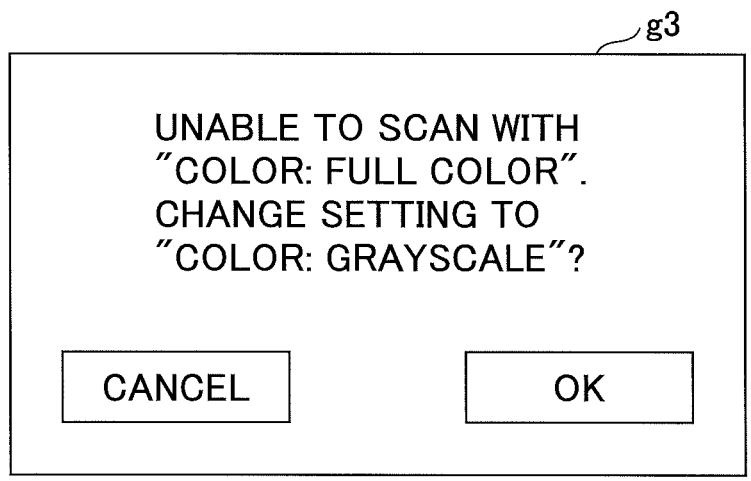
FIG. 23 is a drawing illustrating an exemplary downgrading confirmation screen.

FIG. 23 is a drawing illustrating an exemplary downgrading confirmation screen g3. In the example of FIG. 23, the user is asked whether it is acceptable to change the color setting from "full color" to "grayscale".

When the OK button is selected on the downgrading confirmation screen g3 to accept the downgrading (YES in S705), the current job is executed based on the downgraded configuration information (S706). For example, when the current job is a print job, step S409 of FIG. 19 is performed based on the downgraded print configuration information. Similarly, when the current job is a scan job, step S606 of FIG. 21 is performed based on the downgraded scan configuration information.

Meanwhile, when the CANCEL button is selected on the downgrading confirmation screen g3 to refuse to accept the downgrading (NO in S705), the current job is not executed.

As described above, the widget 21 of the present embodiment is configured to display a list of valid apparatuses for the widget 21. This configuration enables the user to determine an image forming apparatus 10 that can execute the widget 21 before moving to the location where the image forming apparatus 10 is installed. This in turn makes it possible to prevent a case where the user notices that the widget 21 is not executable on a selected image forming apparatus 10 after operating the image forming apparatus 10, and thereby makes it possible to reduce the workload of the user.

In the above embodiment, the function validity information collecting unit 225 is an example of a receiving unit, the widget information registration unit 222 is an example of a reception unit, the valid apparatus determining unit 226 is an example of a determining unit, the widget information providing unit 223 is an example of a transmitting unit, and the valid apparatus query unit 215 is an example of a display control unit.

An information processing apparatus, an information processing system, and a storage medium of preferred embodiments are described above. However, the present invention is not limited to the specifically disclosed embodiments, and variations and modifications may be made without departing from the scope of the present invention.

An aspect of this disclosure provides an information processing apparatus, an information processing system, and a storage medium storing program code that make it possible to reduce the workload of a user in operating programs that collaborate with image forming apparatuses via a network.

What is claimed is:

1. An information processing apparatus connected via a network to plural image forming apparatuses, the information processing apparatus comprising:
a storage unit configured to store a program; and
a processor configured to execute the program,
wherein the program which, when executed by the processor, functions as:
a receiving unit configured to receive function validity information from each of the image forming apparatuses, the function validity information indicating functions that are valid in the respective image forming apparatuses;
a reception unit configured to register an internally generated execution request for requesting the image forming apparatuses to execute a requested function, wherein the execution request does not include information identifying one of the image forming apparatuses where the requested function is to be executed;
a determining unit configured to determine one or more of the image forming apparatuses where the requested function is valid based on the function validity information;
a display control unit configured to cause a display unit to display information indicating the one or more of the image forming apparatuses where the requested function is valid based on a result of the determination by the determining unit; and
a transmitting unit configured to send the execution request to a selected image forming apparatus of the image forming apparatuses when a reception instruction to receive the execution request is entered on the selected image forming apparatus.

2. The information processing apparatus as claimed in claim 1, wherein the transmitting unit is configured to send the information indicating the one or more of the image forming apparatuses where the requested function is valid to the selected image forming apparatus together with the execution request.

3. The information processing apparatus as claimed in claim 1, wherein when the requested function is not valid in the selected image forming apparatus, the transmitting unit is configured to not send the execution request to the selected image forming apparatus.

4. An information processing system, comprising:
an information processing apparatus; and
a plurality of image forming apparatuses connected via a network to the information processing apparatus,
wherein the information processing apparatus includes:
a storage unit configured to store a program; and
a processor configured to execute the program,
wherein the program which, when executed by the processor, functions as:
a receiving unit configured to receive function validity information from each of the image forming apparatuses, the function validity information indicating functions that are valid in the respective image forming apparatuses,
a reception unit configured to register an internally generated execution request for requesting the image forming apparatuses to execute a requested function, wherein the execution request does not include information identifying one of the image forming apparatuses where the requested function is to be executed,
a determining unit configured to determine one or more of the image forming apparatuses where the requested function is valid based on the function validity information,
a display control unit configured to cause a display unit to display information indicating the one or more of the image forming apparatuses where the requested function is valid based on a result of the determination by the determining unit, and
a transmitting unit configured to send the execution request to a selected image forming apparatus of the image forming apparatuses when a reception instruction to receive the execution request is entered on the selected image forming apparatus.

5. The information processing system as claimed in claim 4, wherein the transmitting unit is configured to send the information indicating the one or more of the image forming apparatuses where the requested function is valid to the selected image forming apparatus together with the execution request.

6. The information processing system as claimed in claim 4, wherein when the requested function is not valid in the selected image forming apparatus, the transmitting unit is configured to not send the execution request to the selected image forming apparatus.

7. The information processing system as claimed in claim 4, wherein each of the image forming apparatuses includes at least one of a printing function, a scanning function, a copying function, and a facsimile transmission and reception function.

8. A non-transitory computer-readable storage medium storing program code for causing an information processing apparatus to perform a method, the information processing apparatus being connected via a network to plural image forming apparatuses, the method comprising the steps of:

receiving function validity information from each of the image forming apparatuses, the function validity information indicating functions that are valid in the respective image forming apparatuses;

registering an internally generated execution request for requesting the image forming apparatuses to execute a requested function, wherein the execution request does not include information identifying one of the image forming apparatuses where the requested function is to be executed;

determining one or more of the image forming apparatuses where the requested function is valid based on the function validity information;

causing a display unit to display information indicating the one or more of the image forming apparatuses where the requested function is valid based on a result of the determining step; and sending the execution request to a selected image forming apparatus of the image forming apparatuses when a reception instruction to receive the execution request is entered on the selected image forming apparatus.

9. The storage medium as claimed in claim 8, wherein in the sending step, the information indicating the one or more of the image forming apparatuses where the requested function is valid is sent to the selected image forming apparatus together with the execution request.

10. The storage medium as claimed in claim 8, wherein when the requested function is not valid in the selected image forming apparatus, the execution request is not sent to the selected image forming apparatus.

* * * * *